United States Patent [19]
Fast et al.

[11] Patent Number: 5,729,635
[45] Date of Patent: *Mar. 17, 1998

[54] OCR IMAGE FREE-PROCESSING METHOD FOR IMAGE ENHANCEMENT OF SCANNED DOCUMENTS

[75] Inventors: Bruce B. Fast, San Carlos; Dana R. Allen, Redwood City, both of Calif.

[73] Assignee: TMSSequoia, Burlingame, Calif.

[*] Notice: The term of this patent shall not extend beyond the expiration date of Pat. No. 5,594,815.

[21] Appl. No.: 733,208

[22] Filed: Oct. 17, 1996

Related U.S. Application Data

[60] Continuation of Ser. No. 447,215, May 22, 1995, Pat. No. 5,594,815, which is a division of Ser. No. 963,051, Oct. 19, 1992, abandoned.

[51] Int. Cl.$^6$ .................................................. G06K 9/40
[52] U.S. Cl. ........................ 382/254; 382/289; 382/291; 382/245
[58] Field of Search .................... 382/254, 274, 382/275, 289, 290, 291, 294, 296, 245, 235; 358/261.1, 462, 463

[56] References Cited

U.S. PATENT DOCUMENTS

| | | | |
|---|---|---|---|
| 4,093,941 | 6/1978 | Bryan et al. | 340/146 |
| 4,665,441 | 5/1987 | Sakaue et al. | 358/280 |
| 4,703,363 | 10/1987 | Kitamura | 358/284 |
| 4,783,840 | 11/1988 | Song | 382/54 |
| 4,837,845 | 6/1989 | Pruett et al. | 382/46 |
| 4,866,784 | 9/1989 | Barski | 382/46 |
| 4,876,730 | 10/1989 | Britt | 382/37 |
| 4,876,732 | 10/1989 | Miyagawa et al. | 382/41 |
| 4,876,733 | 10/1989 | Lavin | 382/27 |
| 4,929,085 | 5/1990 | Kajihara | 364/518 |
| 4,941,189 | 7/1990 | Britt | 382/46 |
| 4,975,977 | 12/1990 | Kurosu et al. | 382/46 |
| 4,980,923 | 12/1990 | Kawamoto et al. | 382/41 |
| 4,995,089 | 2/1991 | Altrieth, III | 382/46 |
| 5,001,766 | 3/1991 | Baird | 382/46 |
| 5,027,227 | 6/1991 | Kita | 358/488 |
| 5,034,733 | 7/1991 | Okazawa et al. | 340/727 |
| 5,048,109 | 9/1991 | Bloomberg et al. | 382/50 |
| 5,054,098 | 10/1991 | Lee | 382/46 |
| 5,060,276 | 10/1991 | Morris et al. | 382/8 |
| 5,063,526 | 11/1991 | Kagawa | 395/155 |
| 5,063,605 | 11/1991 | Samad | 382/44 |
| 5,065,437 | 11/1991 | Bloomberg | 382/9 |
| 5,068,904 | 11/1991 | Yamazaki | 382/46 |
| 5,594,815 | 1/1997 | Fast et al. | 382/289 |

Primary Examiner—Leo Boudreau
Assistant Examiner—Phuoc Tran
Attorney, Agent, or Firm—Paul F. Schenck

[57] ABSTRACT

A method is provided for identifying, correcting, modifying and reporting imperfections and features in pixel images that prevent or hinder proper OCR (Optical Character Recognition) and other document imaging processes. One embodiment of this invention provides that run length compressed images can be analyzed and corrected directly for improved performance. Major steps included in this invention for the enhancement of images for OCR and document imaging are: The detection of undesired printed matter and the deletion of undesired printed matter. Detection of undesired printed matter includes successive generation of entries into an array listing of undesired printed matter to be deleted. Deletion of undesired printed matter follows in a separate step for all types of undesired printed matter.

9 Claims, 28 Drawing Sheets

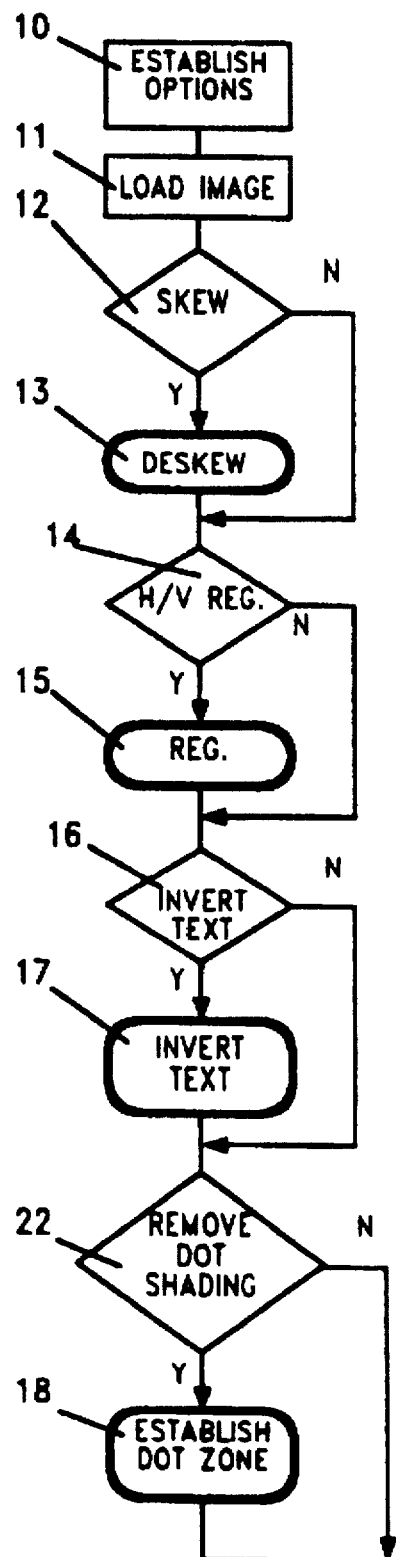
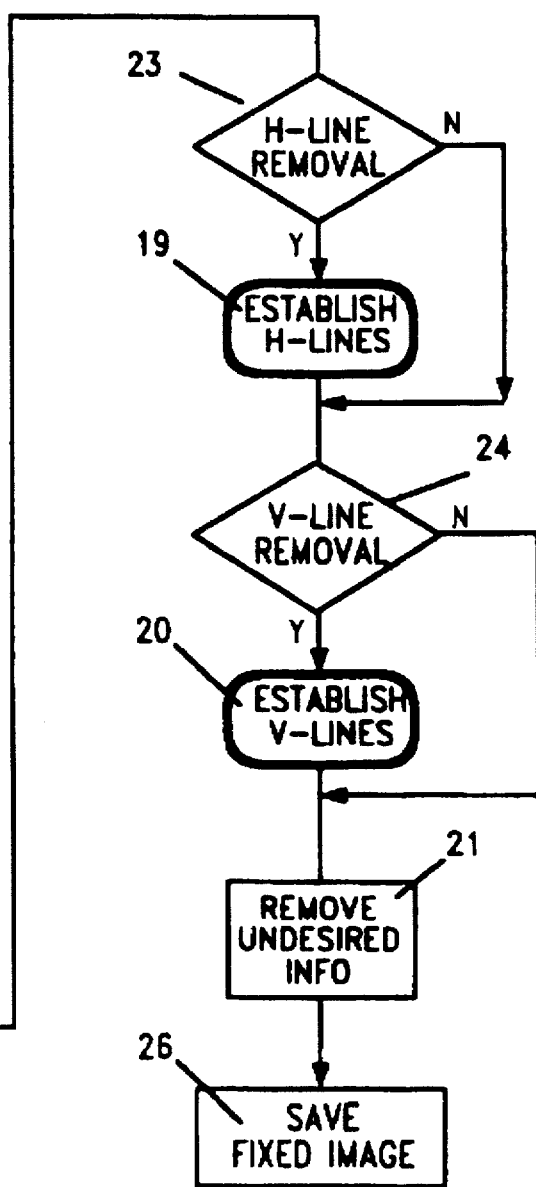
FIG. 1a

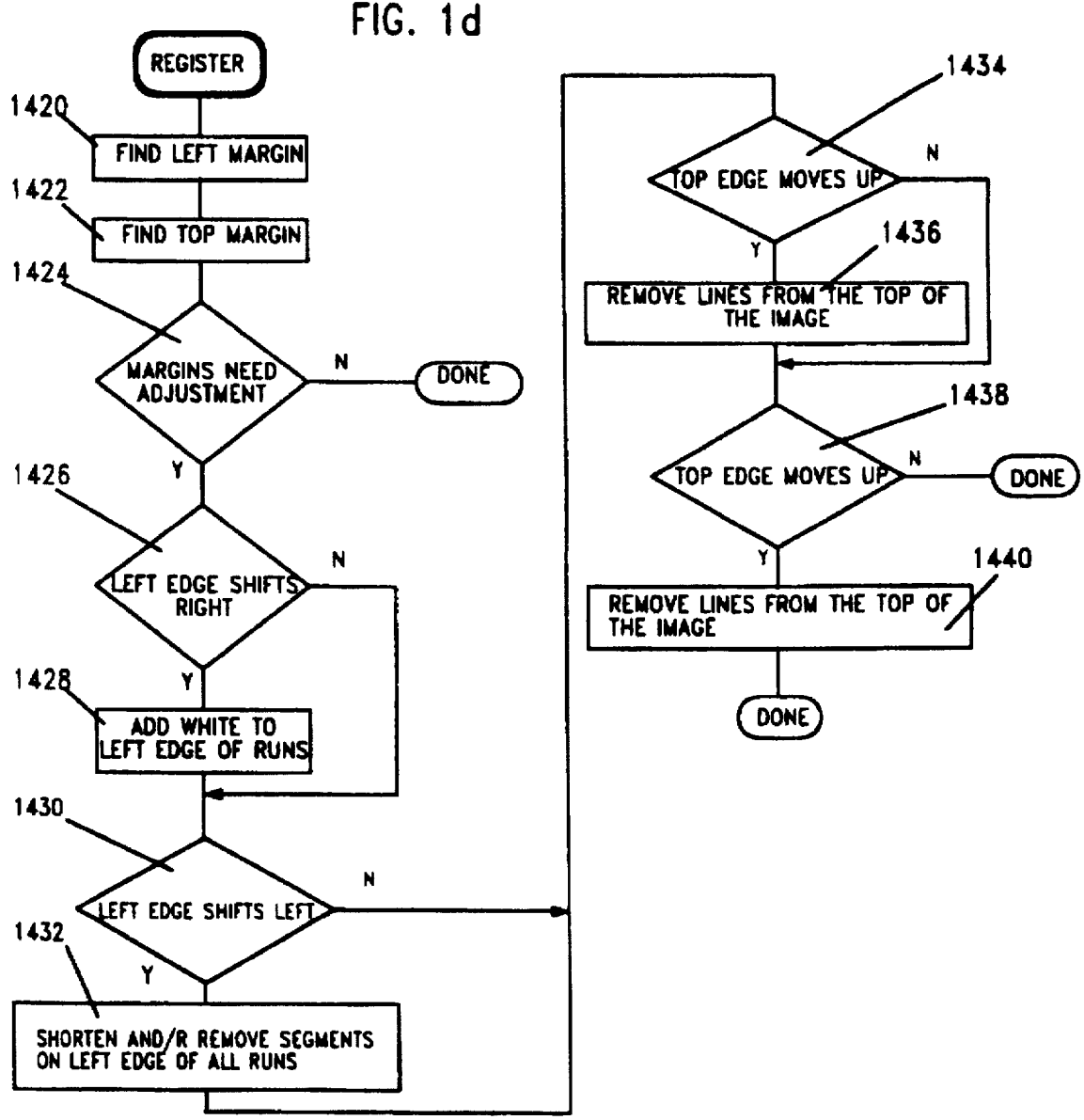

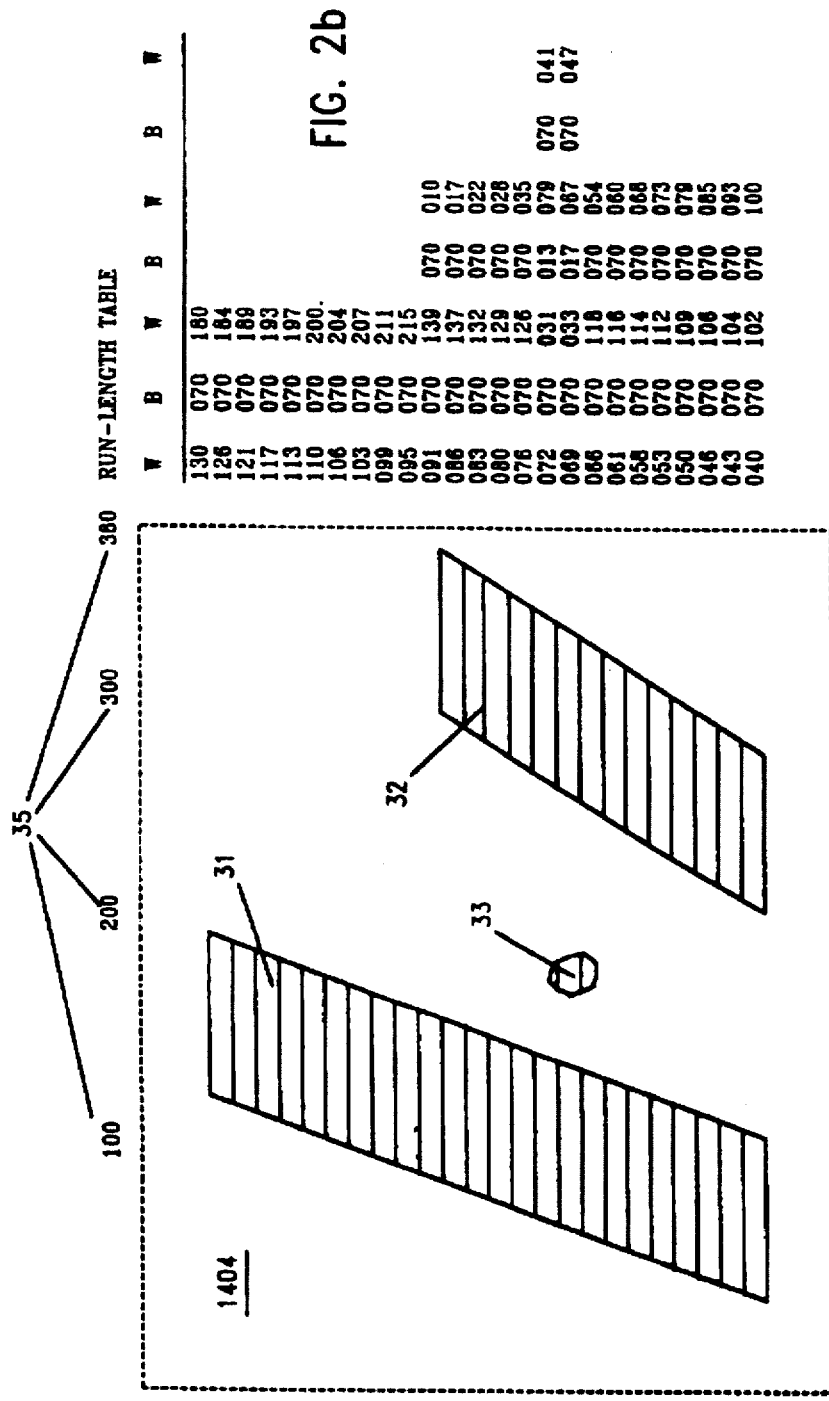

FIG. 5a
This is a test line to demonstrate the method of blurring a line for defining a reference for each line.
FIG. 5b
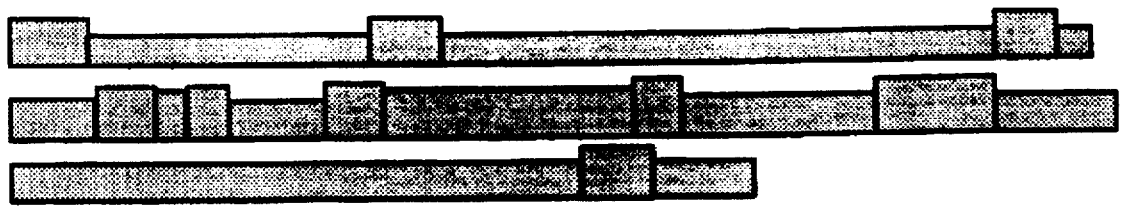
FIG. 5c
FIG. 5d

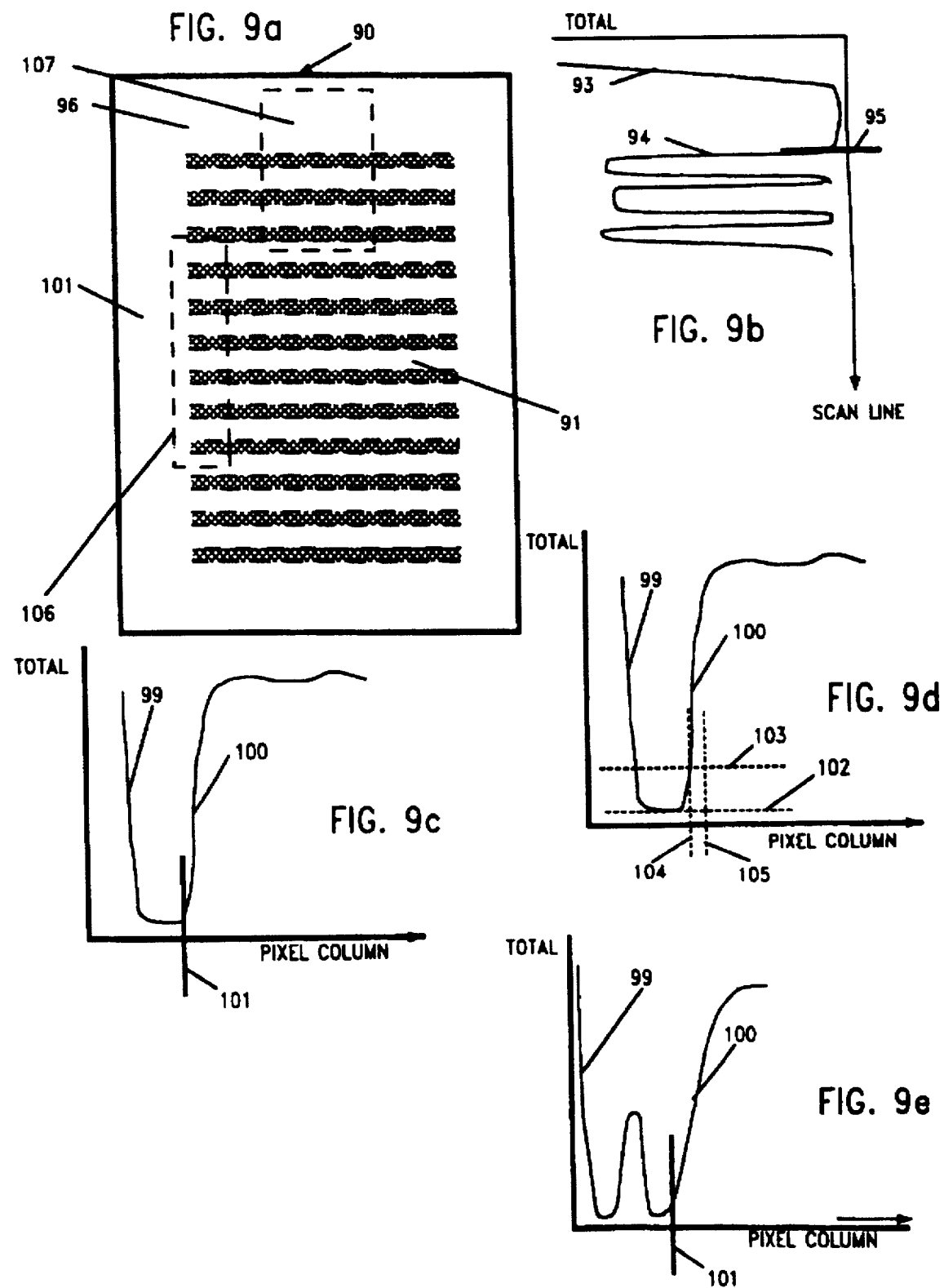

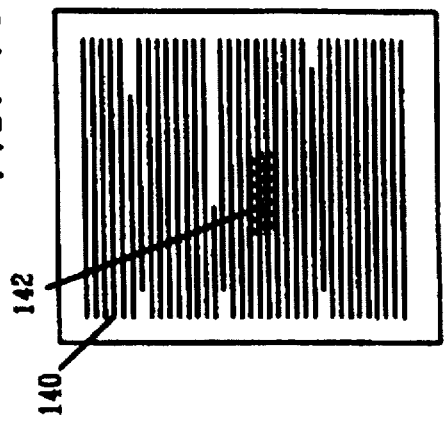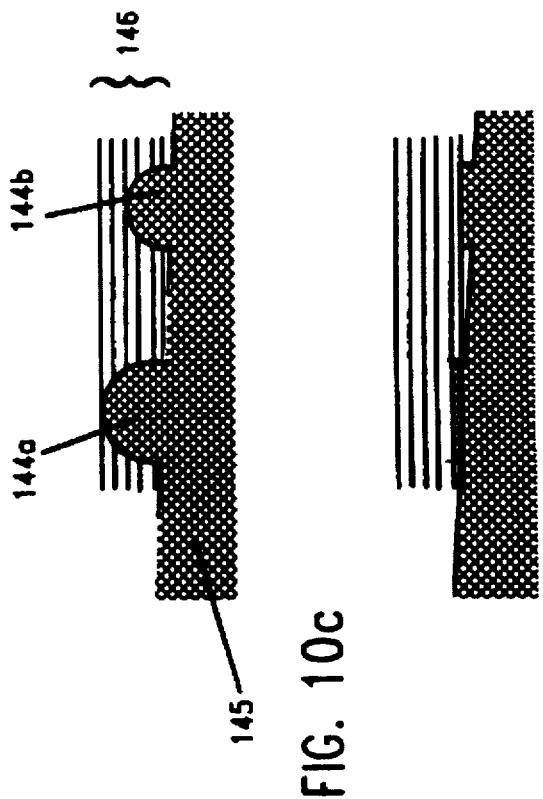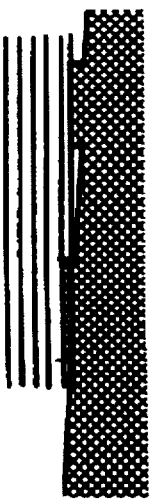

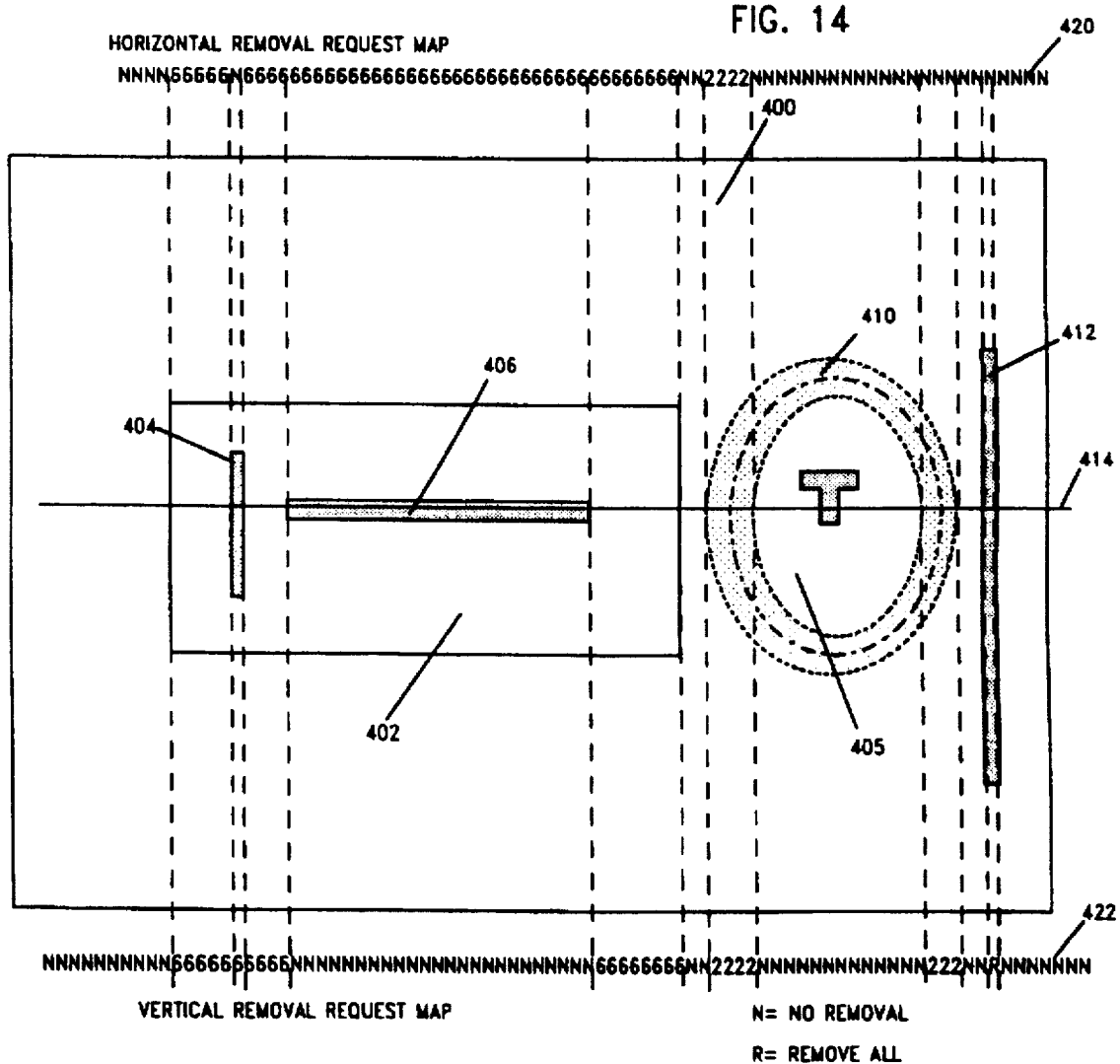

OCR IMAGE FREE-PROCESSING METHOD FOR IMAGE ENHANCEMENT OF SCANNED DOCUMENTS

This is continuation application of patent application Ser. No. 08/447,215, filed May 22, 1995, now U.S. Pat. No. 5,594,815, which is a divisional application of patent application Ser. No. 07/963,051, filed Oct. 19, 1992, abandoned.

BACKGROUND OF THE INVENTION

Computerized document processing includes scanning of the document and the conversion of the actual image of a document into an electronic image of the document. The scanning process generates an electronic pixel representation of the image with a density of several hundred pixels per inch. Each pixel is at least represented by a unit of information indicating whether the particular pixel is associated with a 'white' or a 'black' area in the document. A pixel information may include other information relating to more colors than 'black' and 'white', and it may include grey scale information. The pixel image of the document may be stored and processed directly or it may be converted into a compressed image which requires less space for storing the image on a storage medium such as a storage disk in a computer. Images of documents are often processed through OCR (optical character recognition) so that the contents can be converted back to coded text.

In image processing and character recognition proper orientation of the image on the document to be processed is advantageous to essential. One of the parameters to which image processing operations are sensitive is the skew of the image in the image field. The present invention provides for pre-processing of images to eliminate skew and other characteristics detrimental to many image processing operations. Besides de-skewing, the processes of the present invention provides for consistent registration, converting inverse type to normal type, eliminating dot shading, removing random specks, eliminating horizontal and vertical lines, and protecting characters during line and dot removal.

Prior art processes require images to be converted into a pixel map. Pixel maps require large amounts of memory and are slow in executing such complex processes as needed for preparing images for other processes such as character recognition, especially when using byte oriented processors.

OBJECTS OF THE PRESENT INVENTION

It is an object of this invention to process and correct images directly in run-length code.

It is another object of the present invention to provide for image processing procedures which operate on run-length coded images.

It is another object of the invention to provide for image analysis and correction processes which can be applied directly to images in normal pixel representations.

It is an object of the present invention to detect the amount and direction of skew of an image of a document, by detecting textural lines, graphical lines or borders of graphics.

It is another object of the present invention to eliminate the skew of the image of a document and report the amount of skew detected.

It is another object of this invention to provide for processes for scanning the image of a document with the intent to find certain characteristics typical of varying registration of the image (margins), which may reduce accuracy of a character recognition operations, especially when the location of a field on a form etc., is required for data capture.

It is another object of this invention to correct text registrations.

It is another object of this invention to consistently register images to the same left and upper margins.

It is another object of this invention to provide for processes for scanning the image of a document with the intent to find certain characteristics typical of inverse type image areas, which may reduce accuracy of processes such as character recognition.

It is another object of this invention to provide for converting inverse text areas (white on black) to normal text areas (black on white) and to report the associated location coordinates.

It is another object of this invention to provide for processes for scanning the image of a document with the intent to find certain characteristics typical for an image that includes dot shading, which may reduce accuracy of processes such as character recognition.

It is another object of the invention to eliminate dot shading from a document for better image processing and to optionally report the location and coordinates of a zone including dot shading.

It is another object of this invention to establish an effective dot size for dot shaded areas.

It is another object of this invention to protect characters while removing dots around and touching them in dot shaded areas.

It is another object of the invention to eliminate random specks and image "dirt".

It is another object of this invention to protect characters while removing random specks.

It is another object of this invention to remove specks and dot shading, thereby increasing OCR accuracy.

It is another object of the invention to decrease the size of a compressed image by removing specks and dot shading.

It is another object of this invention to provide for processes for scanning the image of a document with the intent to find certain characteristics typical for an image including horizontal and vertical lines, which may reduce accuracy of a character recognition operation.

It is another object of the invention to delete horizontal and vertical lines without reducing readability of textual matter and to report their location coordinates.

It is another object of the invention to protect textual matter intersected by lines during the line removal process.

It is another object of this invention to find and remove dot leaders.

It is another object of this invention to extract a column from an image.

It is another object of this invention to provide for an image pre-processing method with selectively activatable processes for de-skewing images, detecting and correcting image registration, detecting and converting inverse text, detecting and removing dot shading and dot leaders, detecting and removing horizontal and vertical lines, and protecting characters during line removal and shading removal.

It is another object of this invention to provide for proper sequencing of operations.

It is another object of the invention to provide for a method for determining work areas in which certain operations are to be executed.

It is another object of this invention to provide for forms identification using reports created by line detection, dot shading detection and inverse image detection processes.

It is another object of this invention to partition the image pre-processes into image evaluation, generation of execution parameters and the actual execution of the image correcting processes.

SHORT DESCRIPTION OF THE DRAWINGS

FIGS. 2a through 2c are illustrations and tables relating to run-length representation of printed matter and the processing of run-length values.

FIGS. 5a through 5d are schematic illustrations of the principle of blurring textual not-skewed and skewed matter for measuring line skew.

FIGS. 9a through 9e are illustrations and graphics in support of the image registration process.

FIGS. 10a through 10c are illustrations of dot shaded printed matter and the removal of the dots from the printed information.

FIG. 14 is an illustration in support of the DOT, SPECK and LINE removal process which illustrates the creation of horizontal and vertical information removal maps.

SHORT DESCRIPTION OF THE INVENTION

Figure 1B:
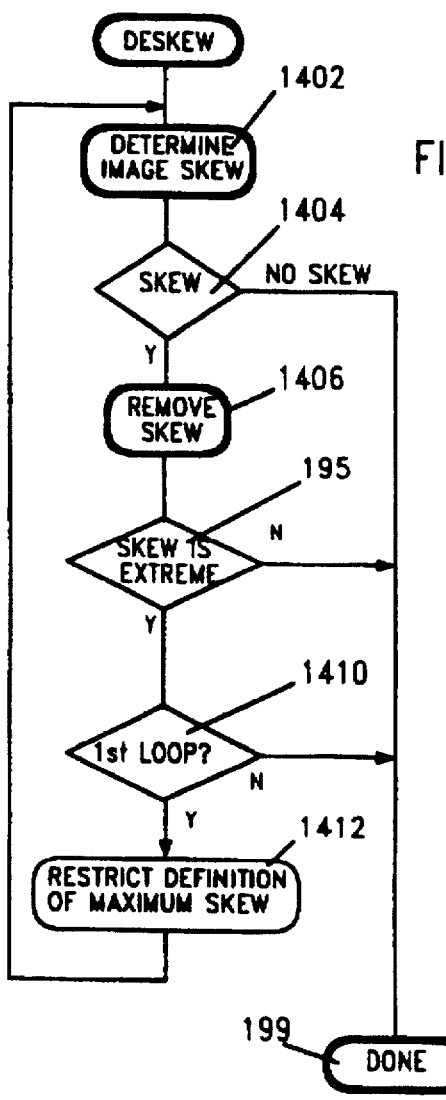
FIGS. 1a through 1r are illustrations of flow charts of the process of the present invention and its major process steps.

Known image enhancement methods require the conversion of a document to be processed into a pixel map image. The processes of the present invention can use run-length coded representation of the image to be processed. Instead of having to step from pixel to pixel, the processes of this invention step from one color segment to the next different color segment. Each segment is identified by its length, which could be its length in number of pixels. The preferred embodiment of the present invention directly processes run length coded images.

In the following disclosure and description of the present invention, the term BLACK is considered to be that color or set of colors which appear to be the foreground or information of the image, the term WHITE is considered to be that color or set of colors which appear to be the background of the image. This traditional approach to the categorization of colors into BLACK and WHITE is not perfect. Exception to this categorization is made in the case of reverse print in which the background color is black and the foreground is white. It is a purpose of this invention to improve the categorization of portions of an image into foreground (BLACK) and background (WHITE).

In the following disclosure of processes the term SPECK is considered a not intentionally manufactured item, a DOT is an intentionally manufactured item on an image, normally used for producing shaded areas, often manufactured to simulate a grey coloration.

Before applying an image process such as selection and extraction of certain data fields, character recognition etc., the invention performs operations on the image of a scanned document to improve the performance of image processes. Image processors are sensitive to:

1) Misalignment of the document or image to be processed;
2) Registration of margins that vary;
3) Inverted print of characters;
4) Shading of parts of the image;
5) Specks not related to the actual information;
6) Lines near or crossing textual matter;

The document pre-processor of the present invention follows a newly discovered method of analyzing the occurrence of one or more of these problems and repairing and readjusting the image. Processed images show proper registration and negligible skew, have all dot shadings and lines removed, and have inverted prints converted to normal. The present invention also reports the locations of lines, shading and reverse type.

The description of the present invention follows the preferred sequence of processing the image of a document:

A De-skew

B Registration

C Detect and convert inverse type

D dot-shading detection, reporting and character protection during dot shading removal E Horizontal and vertical line detection and reporting F Character protection for line intersected characters G Removal of dot shading, random specks, horizontal and vertical lines.

According to the methodology of the present invention image processing operations are performed in a sequence of pre-execution process steps and execution process steps. In the pre-execution process steps of an operation the existence of a processible condition is determined, followed by listing the processible conditions and computation of the required execution process parameters. The execution of a particular process is the last process in the sequence. If several processible conditions are detected the execution processes of the different operations can be separated from the pre-execution process steps and combined in one or more process operations.

The information developed by the pre-execution process steps include the amount of skew detected, the amount of registration adjustment required, the location of inverted matter zones, the location and dot sizes of shaded areas, the location length and thicknesses of vertical and horizontal lines. This information is useful in image interpretation operations to detect problem images or equipment problems.

The analysis provided by the registration detection process can be used to separate front and back sides of documents as well as the type of a document. The reports generated by the vertical and horizontal line detection rocess, the shaded area detection process, the inverted matter detection process and other pre-execution processes may contain valuable contextual information about an image as well as image categorization; e.g. in a particular document all sub-titles may be shaded.

The information developed by the pre-execution process steps can be used to separate the image of the actual forms document from the information entered into the forms document, thereby reconstructing the forms document or extracting the image of the information entered into the form. That is, the pre-execution process steps provide all required data for executing a certain process, such as removing undesired matter, as well as providing data for later processes which are not necessarily executed by the OCR image pre-processor of the present invention.

A summary of the pre-execution process reports provides a "fingerprint" of the processed image and can be used as unique identifiers for the images of documents and forms. This can be used for forms identification. Furthermore, the present invention provides for improved image compression by removing matter not essential in later processing operations. Such matter may include lines and dots of dot shaded areas. For example dot shading removal can reduce the size of images in standard compression by 75% or more.

DESCRIPTION OF THE PREFERRED EMBODIMENT

In the following description of the preferred embodiment some of the processes are disclosed using flow charts in which the sequences of the processing steps are detailed; for other processes the required processing steps are demonstrated using illustrations of an image and the stepwise modification of the image during the process.

Basic Processing Operations

In a black/white image the first value represents the white section of the line. The second value represents the length of the first black segment, the third value represents the following white segment of the scanned line. The last value has a value of zero indicating the end of the image. The number of run-length values depends on the number of black segments of a scan line. FIG. 2a is an illustration of an image with two black lines 31 and 32. A small black area 33, a 'speck', is located between the two black lines 31 and 32. The 'speck' 33 is to be detected and removed. Above the image area 34 there is a scale 35 with the pixel column addresses.

Next to the image there is the run-length representation (FIG. 2b) of the image, arranged in the order of the scan lines, which are indicated by horizontal lines in the black area 32 through 33.

In a scan line with only one black segment there are three run-length values. A scan line crossing through two black segment consists of five values. A scan line crossing through three black segments consists of seven values. The sum of all values equals the width of the image. If a scan line starts with a black run length, then a white run-length of zero is prepended.

Each value in a run-length representation of a scan line represents one 'segment'. Each segment represents 1 or more pixels with a constant color.

A segment is deleted from the stored image by adding the segment run-length of the adjacent opposite segments and the run-length of the segment to be deleted. Thus the two white run-lengths and the run-length of the enclosed black segment 33 between the black lines 31 and 32 are replaced by the sum of the three segments. That is, deleting an item from a line shortens the run-length representation of the particular scan line of the image. This process is illustrated below the run-length table of FIG. 2c for the two scan lines 31, 32 including the 'speck' 33.

To modify the length of a segment, the segment's length value is modified, and an inverse modification is made in the adjacent section. If the left side of the segment is to change, then the length of the segment to the left must be affected.

To invert text color, the length of two adjacent segments are summed together to become one segment with the color assignment of the first one of the two segments.

To insert a new segment (infrequently done in this invention), a single segment is divided into three segments, where the sum of the lengths of the three segments is equal to the length of the original segment.

Horizontal shifting of scan lines (multiple segments) is performed by simply changing the length value of the first segment in the line. Increasing a run-length value causes a shift to the right of all segments following the segment with the increased run-length value, reducing a run-length value causes a shift to the left of all segments following the segment with the reduced runlength value.

In the present invention these principles are applied under various rules to remove skew, register images, invert text, remove dots and specks, delete lines, and protect characters and symbols.

The Process of the Invention

FIG. 1a is an illustration of a process flow chart with the major process steps of the present invention. The operation starts with the setting of the various options 10, selection of the major process steps to be executed and the process step parameters, as they are mentioned in the detailed description of the major steps. After loading 11 the real image from a scanner or a stored image from memory the first major process step, deals with image skew 12, it detection and immediate reduction or elimination, called de-skew 13. The following major process steps perform image registration 14 and 15, and conversion of inverted text 16 and 17. If the particular process step is not to be performed execution will be skipped as indicated in the flow chart. The next three major process steps deal with detection and registration of dot shaded areas 18, horizontal lines 19, and vertical lines 20. All three processes can make contributions to a work table which are used in one process step 21 (FIG. 1a), in which all undesired matter is removed from the image. This process step can also perform the random speck removal process. Again, if one or more of the de-shade, de-speck, horizontal line removal and vertical line removal operations are not activated during option selection 10, they will be skipped since no work tables have been established as indicated by the options 22, 23, and 24. The processed image is saved 26 for later use.

The present invention processes run-length coded images directly. In a few special operations the present invention converts a horizontal run-length code to a vertical run-length code or a pixel map. A run-length code of an image shows for every scan line the uninterrupted lengths of the contrasting successive segments in the scanned line.

Proper sequencing of operations and the method for determining work areas in which certain operations are to be executed is one of the main features of the present invention.

Another feature of this invention is the partitioning of the processes in object evaluation, generation of job parameters and the actual execution of the image process.

De-Skew

Figure 1C:
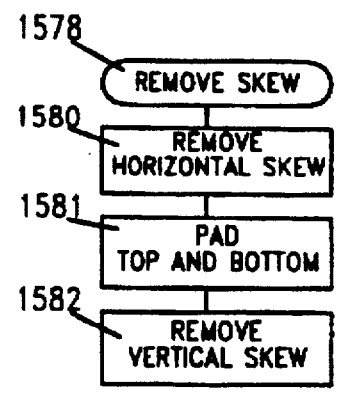
Figure 3A:
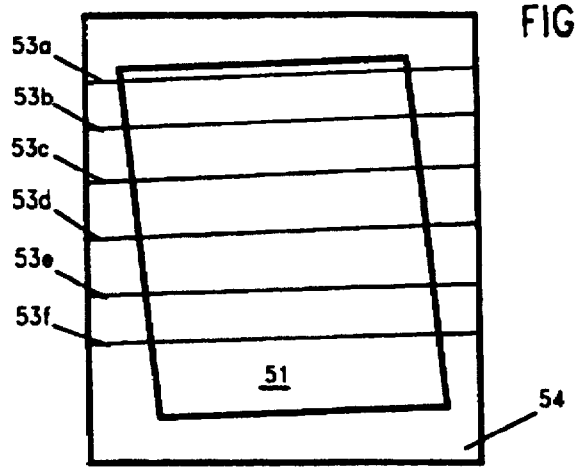
FIGS. 3a through 3c are illustrations of correcting a skewed image of a document.
Figure 4:
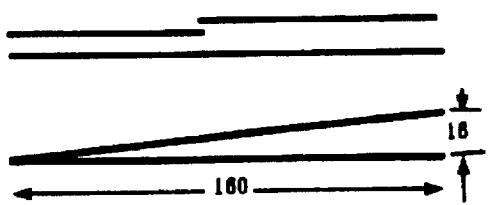
FIG. 4 is an illustration of the skew measurement used in the present invention.
Figure 3B:
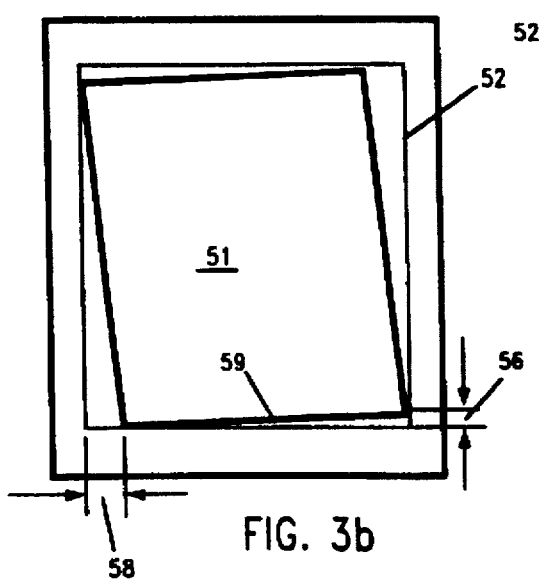
Figure 3C:
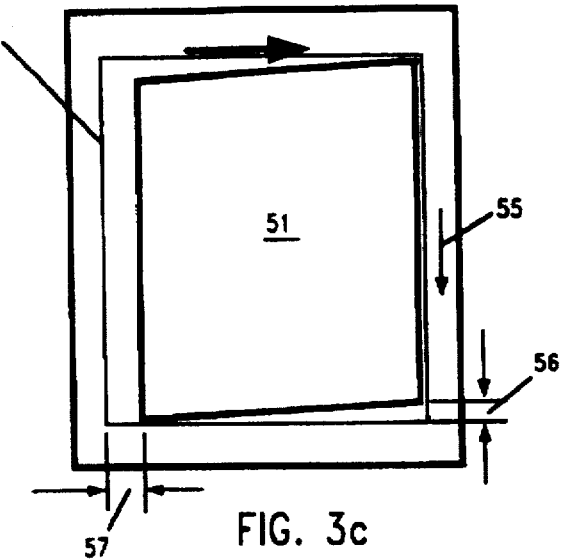

Of the defects listed in the short description of the invention the most well known problem is the skew of an image. Skew is measured in the present invention in numbers of horizontal pixels for 1 pixel of vertical misalignment and includes the information on whether the lines are up or down sloped; thus a small number of horizontal pixels per one pixel misalignment in vertical direction represents a large skew, a large number of pixels per 1 pixel of vertical misalignment represents a smaller skew. Down sloped skew (left to right) are represented by negative values (<0). A slope of −1 in 20 is a down sloped 5% skew. FIG. 3a is an illustration of a skewed image of a document. This skew may be caused in the printing process and/or by the scanning process (as well as by other reproduction processes). Image 54 contains printed matter 51 of which the top, bottom, left and right margins are not parallel to the corresponding borders of the image. The de-skew process will determine the amount of skew then execute the de-skew operation that removes the skew. FIGS. 1b and 1c illustrate the general flow of skew detection and removal.

In a first process step the image is copied into a working storage which is horizontally blurred so that a printed line is represented by a black thick line with a rather smooth bottom edge. FIGS. 5a through 5d are simplified illustrations in which the process is applied to character images. This process step involves first eliminating all white run-length values under a first minimum value, then eliminating all black run-length values under a second minimum value size. In many applications this minimum value is about 0.25". FIGS. 5b and 5c illustrates how the parts of a printed line are converted to blocks of black run length values. This process effectively deletes all descenders below the print line, such as descenders of character 'g' (at the end line 2 in FIGS. 5a through 5c). Horizontal lines are retained in this process, and subsequent processes do not distinguish between horizontal lines or horizontal text.

FIG. 5d is a simplified illustration of a skewed line (FIG. 5c line 2) after blurring. While the top border of the line remains unpredictable, the bottom border shows steps from one scan line to the next scan line. In FIG. 5d the line has a skew of 5 scan lines over the length of the line.

The blurred representation of a given scan line can be generated from the original at any time, therefore an entire blurred representation of the image need not be created at one time, only those scan lines being examined need to be blurred.

A second process step, determines the skew to be eliminated by measuring the skew of a plurality of lines on the blurred representation of the page. The skew to be eliminated is determined by looking for two similarly skewed lines and using the average skew of these two values as the de-skew value for calculating the parameters for the skew elimination process. This process includes determining whether the lower right corner or lower left hand corner has to be dropped to produce horizontal lines when eliminating the vertical skew component.

Figure 6A:
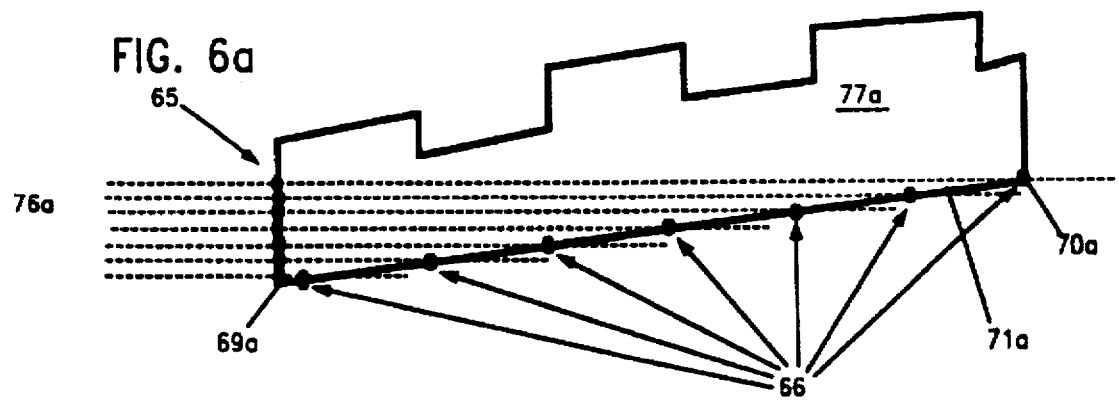
FIGS. 6a and 6b are illustrations of blurred lines with upward skew and downward skew and the method of determining the amount of line skew.
Figure 6B:
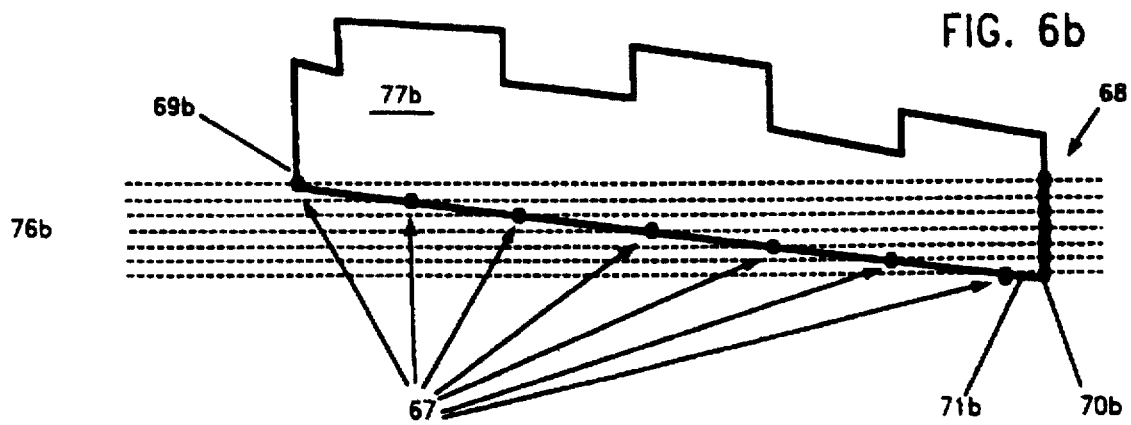

To determine the skew of a line the process uses the blurred image of a line and traces the scan lines which either start or end at the bottom of the blurred line image, see FIG. 6a and 6b. In FIGS. 6a and 6b only those scan lines 76a respectively 76b are shown which pass through bottom borders 71a and 71b of blurred lines 77a and 77b, respectively. In an upward slopped line 77a the start pixel column address 65 for the black run-length segment is rather constant and the right end addresses 66 of the black scan lines segments are traced, FIG. 6a. In a downward slopped line 77b the left end addresses 68 of the black scan line segments are traced, FIG. 6b. The process lists the coordinates of the scanned black run-length segments in a work table for evaluation.

A follow-on process step analyzes the listed values for comparison with the overall slope value (slope 71a in FIG. 6a) determined from the first and last listed values for the particular line 77a in the work table. These values correspond to points 69a and 70a in FIG. 6a. The actual skew value is calculated as the horizontal distance (usually in pixels) between 69a and 70a divided by the number of scan lines of skew involved.

A document to be de-skewed might have multi-column print with a column separation smaller than the set minimum length value for recognized run-lengths, and in which, for some reason, the lines of adjacent columns are not aligned. Because the line blurring process does not distinguish between columns lines in adjacent columns the offset may look like a skew in the base line. In the present invention, such an offset, called fools skew, is not to be taken into consideration when determining an average skew value for the de-skew process.

Figure 7A:
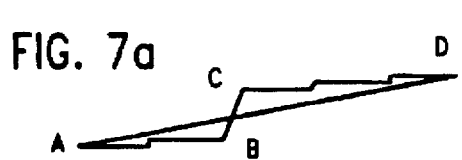
FIGS. 7a, 7b and 7c are illustrations relating to fool's skew conditions.
Figure 7B:
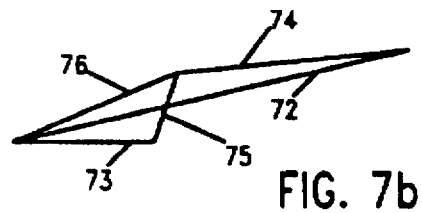
Figure 7C:
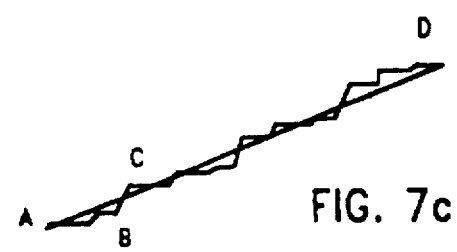

A slope value between starts or ends of adjacent run-length segments (FIG. 7b:75) of less then 5 indicates the possibility of a "fool's skew". Confirmation of a fool's skew is reached by comparing the slope A-B 73 with slope A-C 76 and C-D 74 (see FIG. 7a, for a fool's skew example, and FIG. 7c for non fool's skew example). If slope A-C 76 is nearer to slope C-D 74 than is slope A-B 73 then slope B-C 75 is considered to be a fool's skew condition. If a fool's skew is detected the image line is divided at the location of the detected fool's skew and the slope of the longer subsection is used; In the example of FIG. 7a and the skew of C-D 74 is the working skew. FIG. 7c is an illustration with a plurality of major steps in the skew. In this example the fool's skew condition is not met and the skew is determined by the skew A-D 72.

To determine a de-skew value applicable for the whole image, the process establishes six different skew values that are spaced apart. Among the six skew values the process tries to find at least two skew values which are approximately equal. The approximately equal skew values are averaged together to produce the determined skew value. If no group of approximately equal skew values are found, the process uses the detected skew nearest to the center of the image.

While the above description for determining the skew of an image is based on using textural matter, such as lines containing characters, the skew can be determined as easily using graphical lines and borders. It is a strength of this invention that images with and without textural matter can be de-skewed.

Horizontal skew correction, 1558 (FIG. 1c) is performed by increasing the length of the first (WHITE) segment of each scan line to the amount calculated ted to be necessary. For each scan line, the amount of this adjustment is calculated ted as the distance (in # of scan lines) from the end (top or bottom) of the image divided by the absolute value of the skew. If the skew value is positive, then the bottom of the image is used as "the end" for the above calculation, if the skew value is negative, then the top of the image is used as "the end" for the above calculation. At this time one has to recognized the simplicity of performing such operations in the run-length environment.

The process for eliminating the vertical skew component, 1582 (FIG. 1c) performs a vertical shift up or down on the columns of pixels of the left or right margin. The amount of shift depends on the skew and is proportionally reduced or increased during the process from the right margin to the left margin of the segment.

The de-skew process requires subdivision of every scan line into equal length segments. A de-skew value of 1 per 20 run-length units causes subdivision of the effected scan lines into sub-segments of 20 run-length units. A de-skew value of 1 per 40 run-length units causes subdivision of the effected scan lines into sub-segments of 40 run-length units. The first sub-segment of a scan line remains in place and the remaining sub-segments are proportionally moved downward according to their position relative to the unmoved segment: the second segment is moved by one pixel in vertical direction, the third segment is moved by two pixels etc. This operation removes the vertical component of the skew.

In the process of the preferred embodiment of the present invention, performing the vertical column move in a run length environment is done as follows: In the upper half of FIG. 8 de-skewing of a line in an upward sloped image is illustrated, in the lower half of FIG. 8 de-skewing of a line of a downward sloped image is illustrated. The skew analysis provides the information on the total skew over the width of the printed column. The width of the printed column is then divided in equally sized sections. Initially several cursors are set up, one for each of the sections which after de-skewing form one line. Thus before de-skewing these cursors are placed in adjacent scan lines at the beginning of sections to be aligned with each other. In an upward skewed scan line, where the left edge is to be moved up, the cursor in the top scan line 82 points to the start of the last section column 81e, the cursor in the next line points to the start of the next to last section column 81d and so on for section columns 81c, 81b and 81a. A new top line, aligned with the last column of the scan line 82, is created by copying the contents at the cursor pointing to the first section column 81a into scan line 82, while moving that cursor towards the second column; then copying the contents of section column 81b of the next higher scan line into scan line 82, while moving the associated cursor towards the third column, and so on. This de-skew process advances through all scan lines of the image.

Copying runs in a run-length environment is easy and fast. At the transition between one column and the next, the decision must be made as to whether to continue a run, or to start a new run color. If the color on the line being worked on, at the resultant cursor position, is the same as that of the next line up at it's initial position, then the run length is extended when starting the new line.

Figure 8:
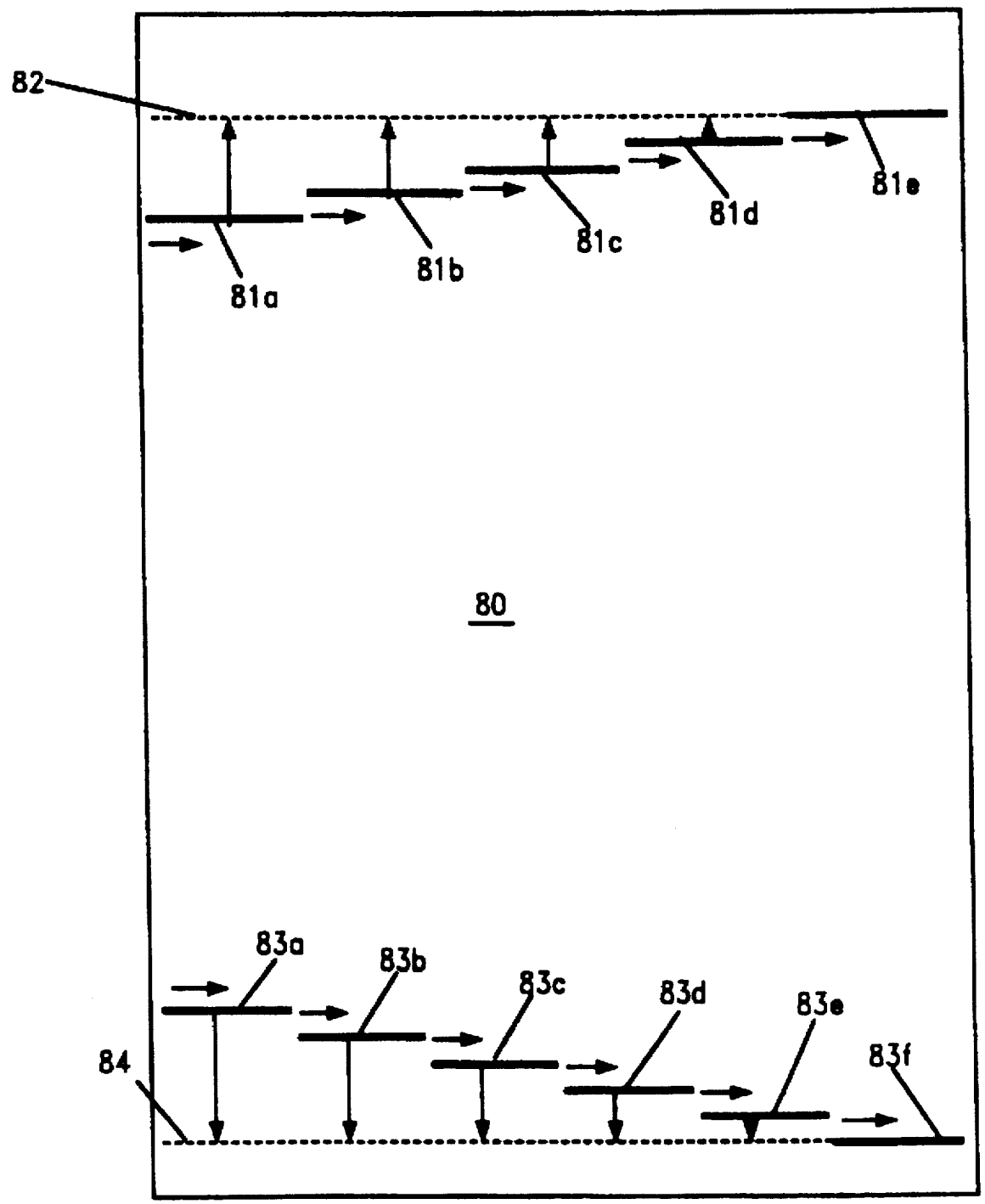
FIG. 8 is an illustration of the correction of upward and downward image skews.

To shift the right edge up, the process works up from the bottom line of the image, in a similar fashion as disclosed above. The lower half of FIG. 8 illustrates the de-skew operation for a downward skewed image. The image is subdivided into section columns (6) according to the amount of skew (5) to be eliminated. The bottom of the printed image is determined by section column at the end of the lowest scan line. A cursor is set up for each of the section columns 83a through 83f in the adjacent scan lines. The cursors sequence the move of the section columns from there original position into scan line 84.

To assure that no image detail is lost, sufficient white scan lines are placed at the top and bottom of the image prior to the start of either process 1582 (FIG. 1c).

The amount and direction of skew may be reported for analytical processing.

Image Registration

FIGS. 1d, 1e, 1f, 9a, 9b and 9c are illustration in support of the registration process.

FIG. 1d is a flow chart of the general image' registration process.

Figure 1E:
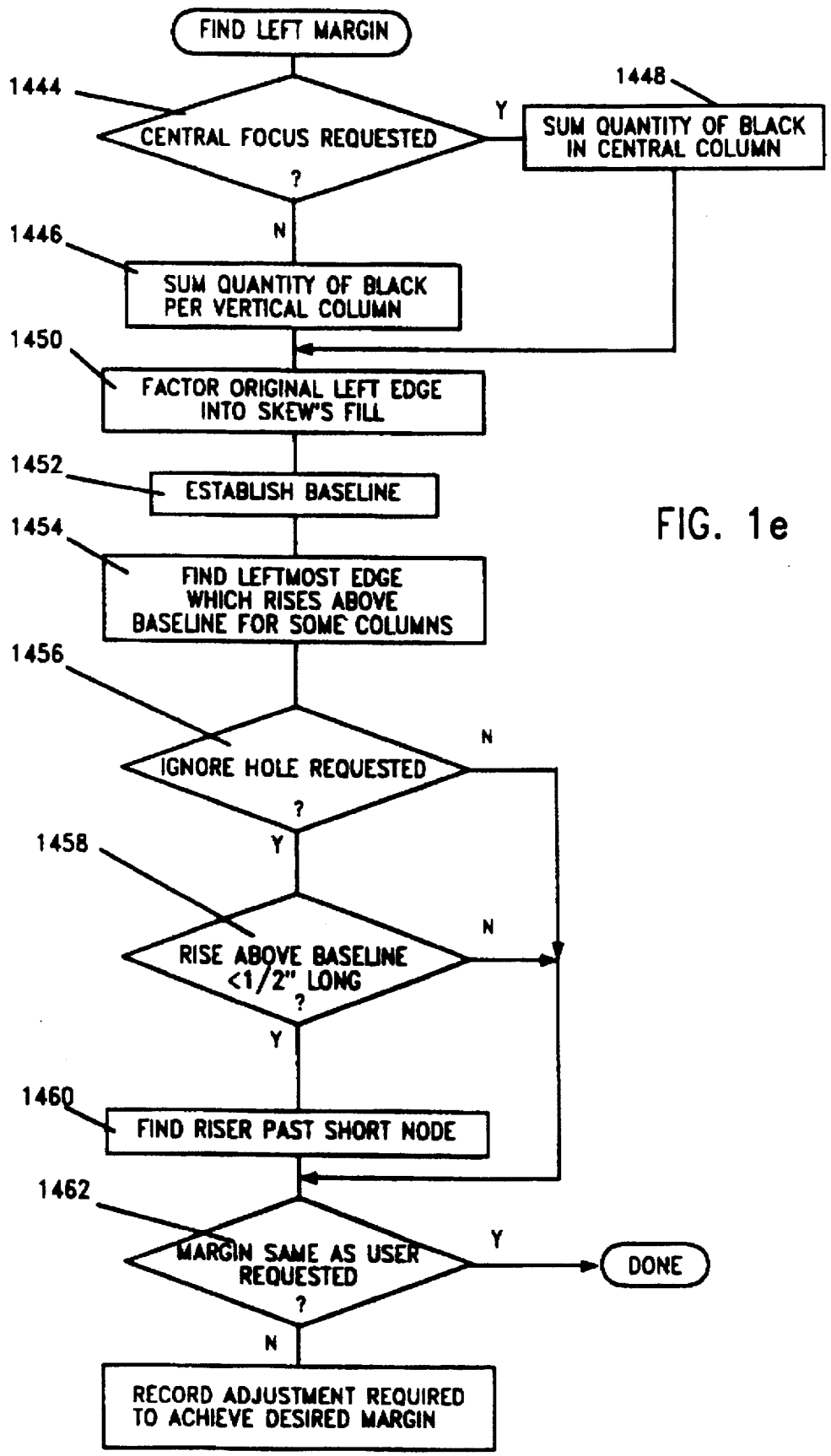

FIG. 1e is a flow chart summarizing the process of determining the left margin.

Figure 1F:
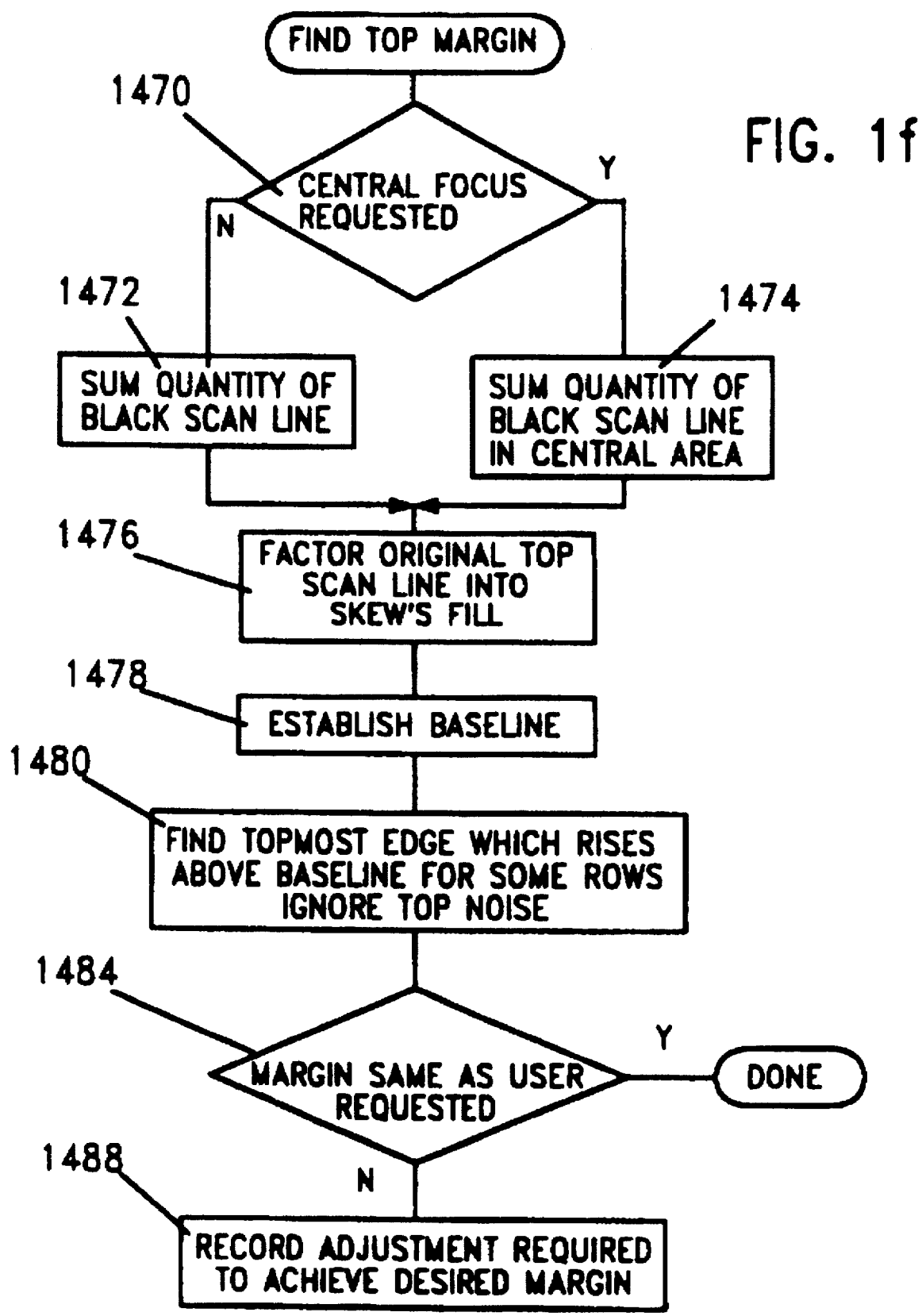

FIG. 1f is a flow chart summarizing the process of determining the top margin.

FIG. 9a is an illustration of a document 90 with some printed matter 91, a top margin 96 and a left side margin 101.

Image registration is a process in which the top and left of the information on the image is determined, and where the top and left margins are adjusted to conform to the user's request. For top margin detection the lengths of all black segments are accumulated and listed per scan line in a table. As illustrated in FIG. 9b, the top margin of the document may have some areas of 'noise' 93 (not the valuable information of the document) which are recognized as black run-lengths. However, in the top margin area the accumulated black run-length values should remain low and then rise significantly, when the top of the image is encountered. The scan line 95 (linked to the first large sum of black run-length values 94) can be used as the location of the top of the information on the image.

For horizontal registration the sum of BLACK in each vertical column is used, 1446 (FIG. 1e). Again, as illustrated in FIG. 9c scanning the border edge of left margin bob may find some 'noise' 99. When the density of black increases dramatically 100 the left edge of the information on the document is established at 101.

In the same fashion, punched holes will be represented by an increase in BLACK accumulation (1456 through 1460, FIG. 1e). Such holes can be detected because the black accumulation will drop off within ½ inch of column (calculated from image resolution). This is illustrated in FIG. 9e, 105.

The threshold between margin and information (1452 FIG. 1e) can be established by determining the minimum accumulated black run-lengths total 102 (FIG. 9d) of a pixel column in the margin zone 101. The desired registration pixel column should have an accumulated black run-length total 103 of at least three times the previously determined minimum black run-length total 102. To assure proper selection the accumulate a black run-length totals of the next 5 or 6 pixel columns (between pixel column reference numbers 104 and 105, FIG. 9d) should not be smaller than the selected multiple of 102, the minimum accumulated black run-length total, see 1454 FIG. 1e.

The white filler with which the de-skew algorithm pads an image tends to move edge noise into the image. This may fool the register algorithm into thinking that the edge noise is valuable information. To prevent this the following procedure is executed:

Prior to de-skewing a copy of the topmost scan line and the leftmost column of the image are saved into temporary buffers (1450, FIG. 1e and 1476, FIG. 1f). The de-skewing process reports to a register the number of lines/columns of maximum padding which have been added. With this information, the amount and location of any white on the edge of the image which was added by the de-skew algorithm. If white run-length value have been added, then the value in the corresponding column/row of the saved buffer is used for the black quantity calculation rather than the white inserted by the de-skewer.

To handle special cases in which an image contains undesired border information, such as headers, footers, logos etc. a user flag is provided to restrict registration analyses to the middle one half 106 and 107 (FIG. 9a), respectively, of the image sections used for the evaluation (1448 FIG. 1e and 1474 FIG. 1f).

The actual registration process in a run-length environment is performed as follows: A user defined margin is subtracted from the calculated edge of the desired image. To adjust the image up, whole scan lines at the top of the image are deleted. To adjust the image down, all white scan lines are inserted at the top. To adjust the image to the right, the leftmost white run-length segment of each scan line is enlarged by the desired amount. To adjust the image to the left, the leftmost run-length segment(s) of every scan line is/are decreased or removed until the appropriate adjustment has been made (1424 through 1440 FIG. 1d).

The amount of horizontal and vertical adjustment made to the image may be reported for analytical processing.

Invert Matter Processing

Figure 1G:
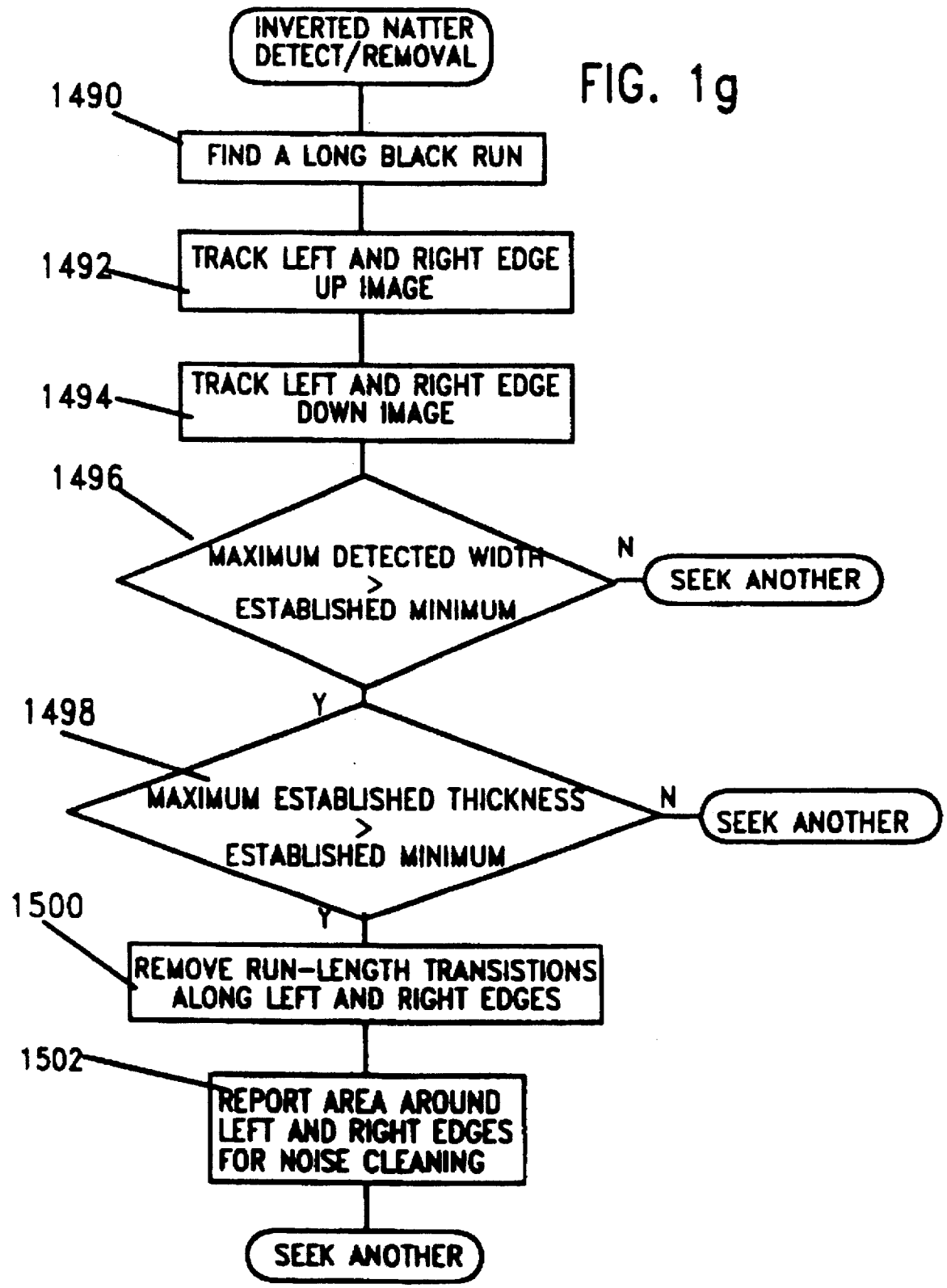

FIG. 1g is a flow chart summarizing the process of detecting and removing inverted matter.

FIGS. 15a through 15f illustrate the process of inverting printed matter, that is converting a white matter in a black background to a black matter on a white background. All operations are directly executed on run-length coded representation of the image.

Figure 15A:
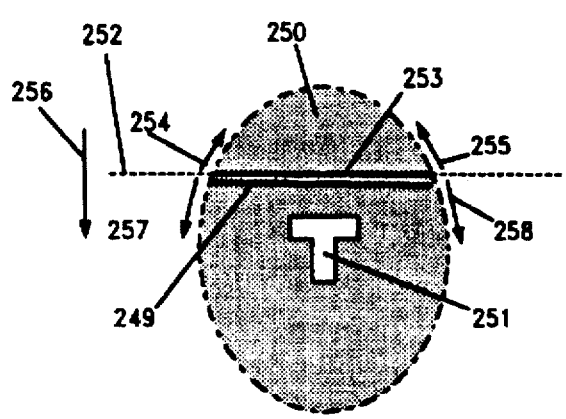
FIGS. 15a through 15f are illustrations in support of the conversion process as applied to an invert text example.

In FIG. 15a a white letter "T" 251 is shown on a black background 250. The black background is oval in this example. A rectangular shaped or odd shaped background can be handled in the same manner as described below.

The process starts with a scan operation of the image to find a black run-length segment 253 larger than a predetermined value (1490, FIG. 1g). If such a run-length segment is found, then the process (1492, FIG. 1g) follows the left and right borders of the black area upwards as indicated by arrows 254 and 255 until the run-length of the black area 250 reduces to zero at the top of the oval shaped black background area 250. All border address values are recorded in a work table. Having defined the upper edge of background area 250 the process continues at scan line 252 where the first recognized long black run length segment 253 was found. In the following step (1494, FIG. 1g) the process determines the shape of black background area 250 below scan line 252, following the directions indicated by arrows 257 and 258. The address values of the left and right borders of area 250 below scan line 252 are recorded in the work table. This process step ends with finding no more black run-length segments linked to area 250. The tracing of the border of area 250 is governed by the rule, that if the left side border of a black run-length segment 253 overlaps the left side border of the vertically adjacent segment 249 and exceeds a user defined minimum run-length, then its left side address is a valid address to be entered into the work table.

The run on the subsequent scan line and the same horizontal offset as the left side border is black and exceeds a defined minimum length, then the left edge of the segment becomes the left edge of the area for this scan line. If the horizontal offset is white, or in too short of a black run, a black run with sufficient length is sought to the right of it. If no adequate run is found who's left edge is to the left of the right edge of the previous line, then the end of the inverted zone is established, otherwise the left edge of the black segment is the left edge of the area for this scan line. Similar analysis determines the right edge for this scan line. This establishes, per scan line the boundaries of area 250.

Figure 15B:
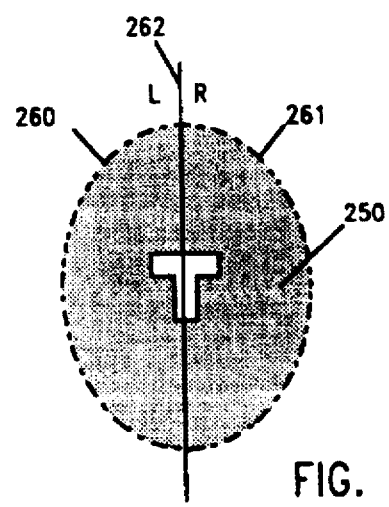

At the end of the first and second process step left and right border addresses 260 and 261 for the left and right side borders of area 250 are defined in the work table (see FIG. 15b). In FIG. 15b, left and right side borders are separated by line 262. The area is measured, 1496 and 1498, FIG. 1g, to determine if it meets the standards of an invert area.

Figure 15C:
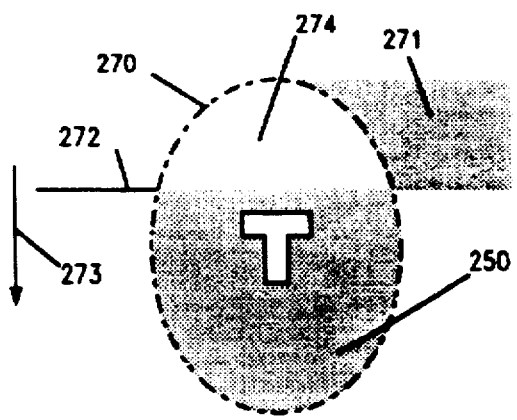

The third process step starts at the top of area 274 and follows the left side border of background area 250 along border line 270 downwards as indicated by arrow 273 (see FIG. 15c). All background area run-length values are added to the preceding white run-lengthvalues, thereby eliminating the blackrun-length segment as indicated in FIG. 15c above the 272, which represents the scan line currently being processed. Eliminating a black run-length segment reverses the color assignment of all following run-length segments in the same scan line. Thus, the segments 271 right of the right border of area 251 changes from a white assignment to a black assignment. As indicated in FIG. 15d, the matter inside the background area 250 is automatically changed to the opposite assignment.

Figure 15D:
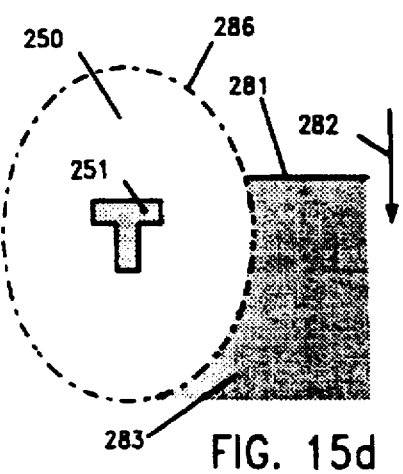
Figure 15E:
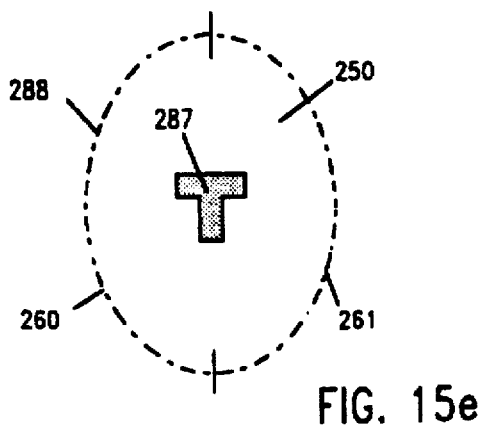

The fourth process step (1500, FIG. 1g) processes the right side border of area 250 in FIG. 15d. This step adds, stepwise in the direction indicated by arrow 282, the white run-length segment left of border 286 to the black run-length segment 281 right of border 286. This process eliminates a segment and therefore reverses the assignments of all run-length values right of border 286. As a result matter 251 previously being white on a black background is now converted to a black matter 287 on a white background and all black run-lengths 283 generated during the preceding process step are reversed to white run-lengths. The formerly visible border 288, consisting of left section 260 and right section 261 now exists only in the work table as a border 288. The area outside the reversed area is unaffected by this process.

Figure 15F:
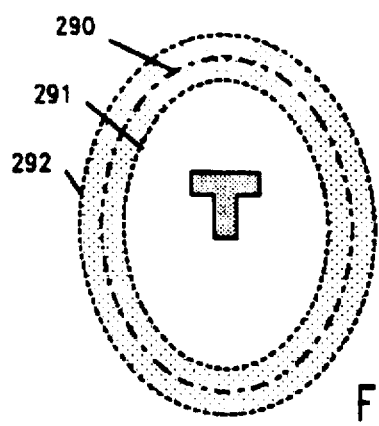

Because all white areas around a black printed area may contain black undesired spots, the process uses the previously defined border of area 258 to define a de-speck zone 1502 (FIG. 1g). As indicated in FIG. 15f an inside border line 291 and an outside border line 292 are established defining the de-speck zone. The spacing of inner border 291 and outer border 292 from left and right borders 260 and 261 of area 250 depends in the particular situation and can be defined as speck-zone width parameter. This de-speck zone is communicated to, DOT, SPECK AND LINE REMOVAL, the facility is described later for removal of any noise surrounding the converted background area.

The areas which are inverted may be reported, or at least a rectangular box bounding these areas may be reported for analysis.

Dot Shading Detection and Sizing

Another process of the present invention detects and removes dot shading from the document. Dot shading is frequently used to attract attention to a textual matter by overlaying the textual matter with a dot pattern.

Figure 1H:
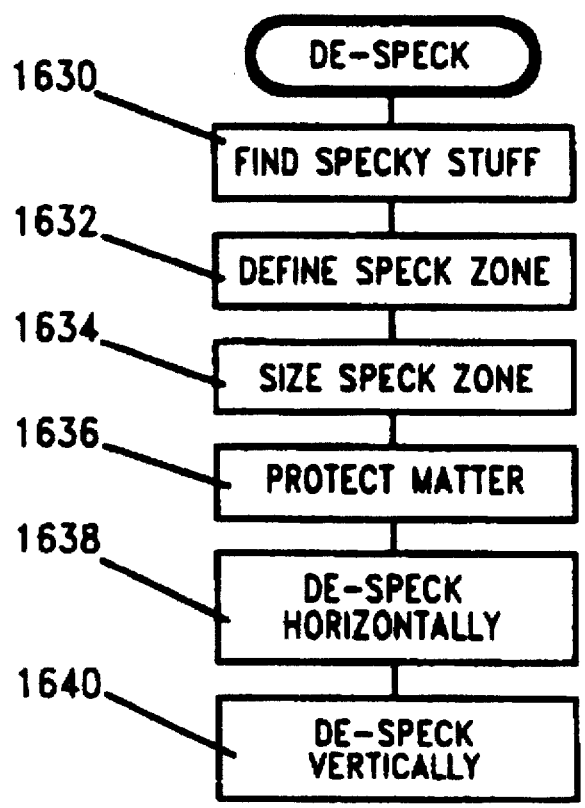
Figure 1M:
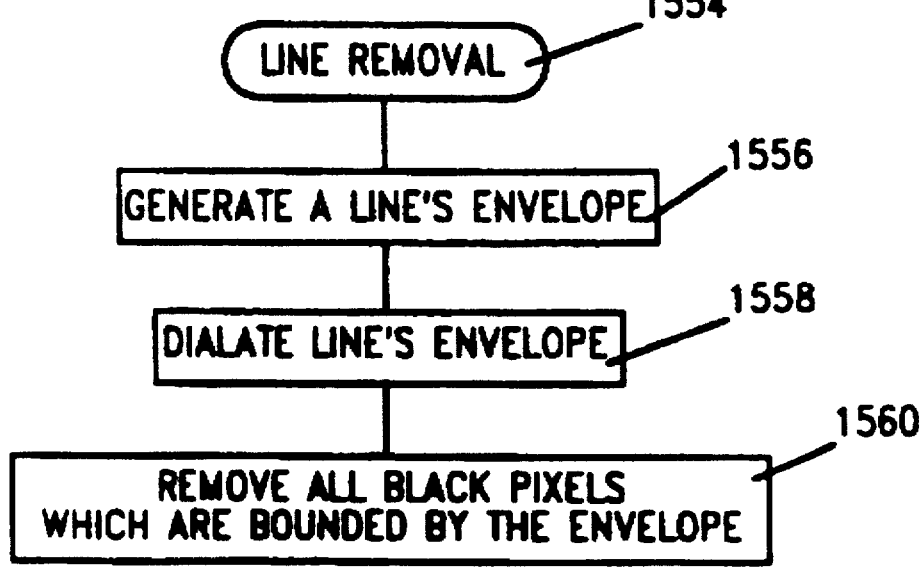
Figure 1I:
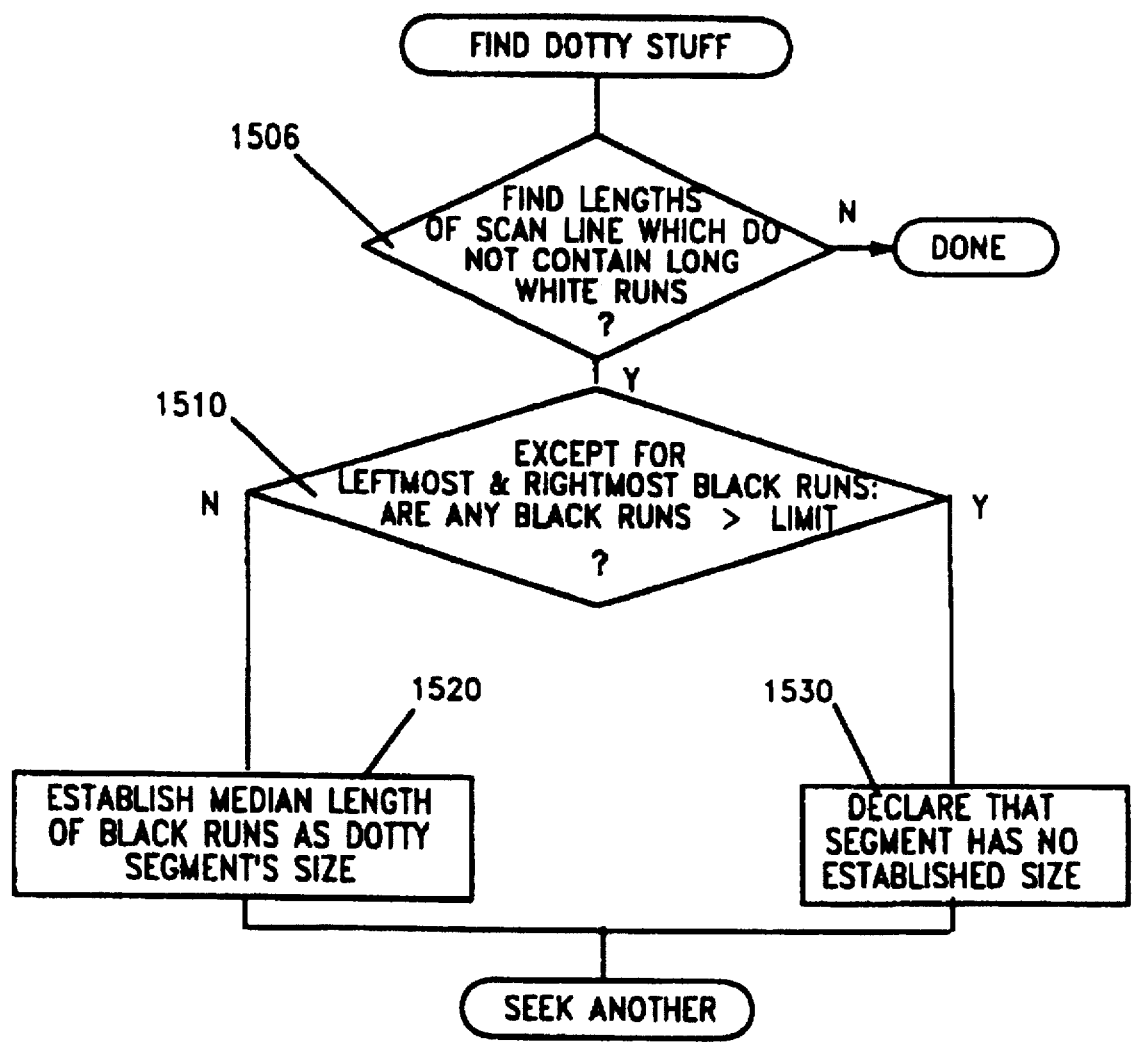
Figure 1J:
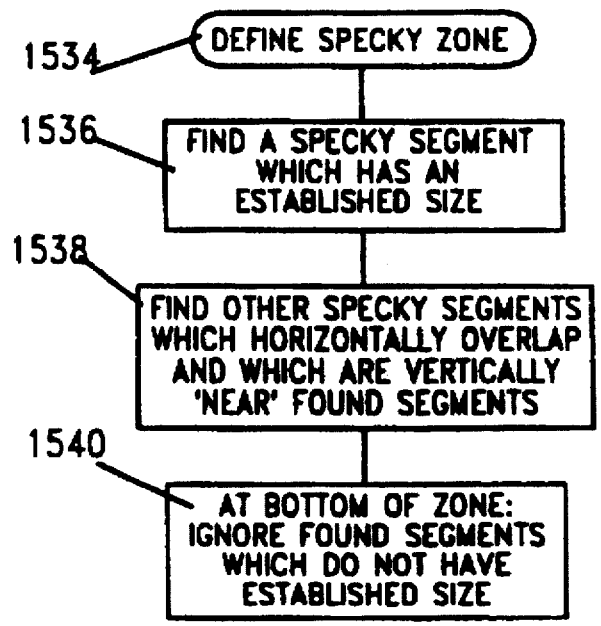
Figure 1L:
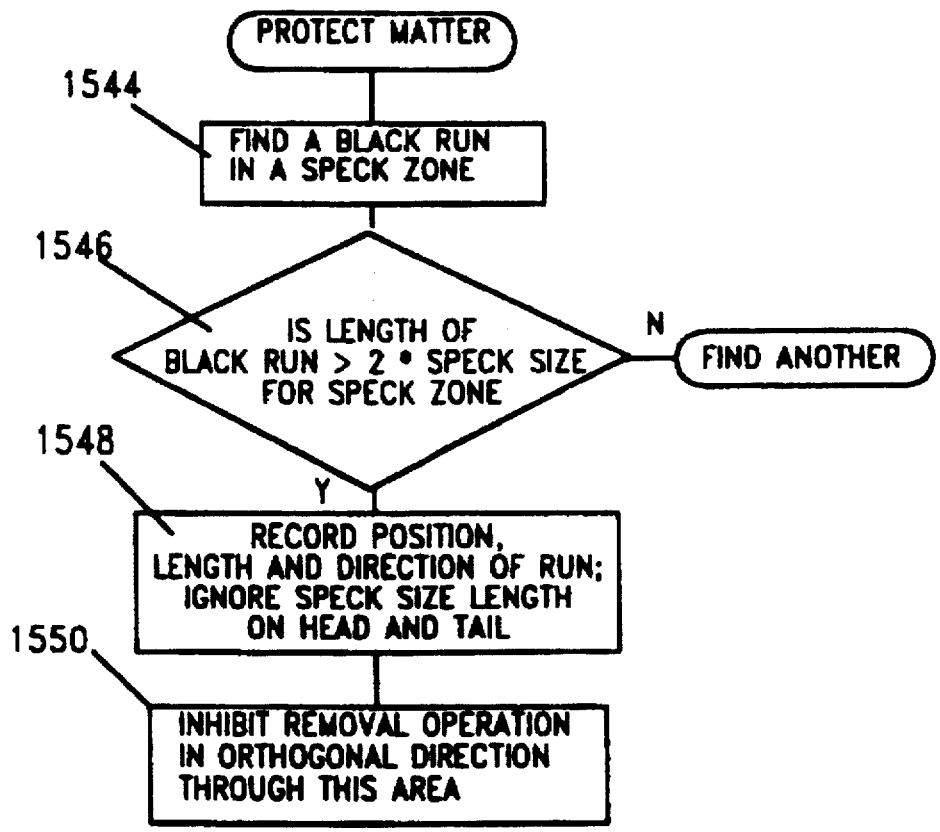
Figure 1K:
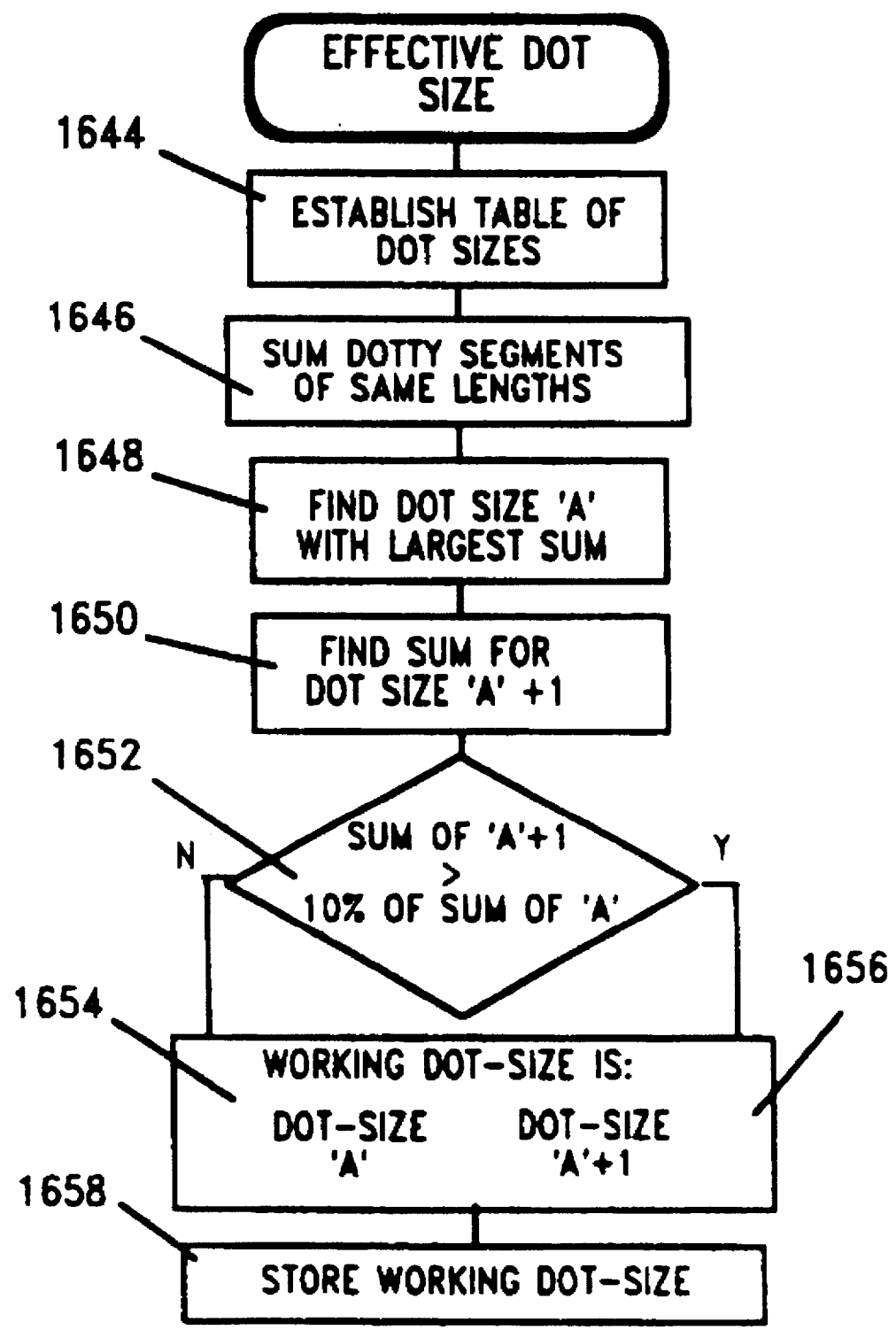

FIGS. 1h through 1l are flowcharts illustrating the primary processes of dot shade detection and sizing. FIG. 1h shows the primary steps. FIG. 1i shows the process of detecting 'dotty stuff'. FIG. 1j shows the process of defining a shaded zone. FIG. 1k shows the process of determining the effective dot size in a zone. FIG. 1l shows the process of protecting solid matter from removal degradation. The process for detecting and removing shading is disclosed in detail with reference to FIGS. 10a through 10c. FIG. 10a is a schematic illustration of a printed page 140. The printed text includes a shaded area 142 which cannot be processed by a currently known optical character recognition processes. However, the 'Dot Shading Removal' process of the present invention will remove all dots not being part of a character. FIG. 10b is an example of a textual matter with shading 141. The process defines the shaded area by a frame 143. FIG. 10c is an example how extrusion 144a and 144b of a slanted near horizontal border 145 of a character or symbol are reduced. If the run-lengths of an extrusion in scan lines 146 are below the set upper limit the run-length values will be combined with the run-length values of the adjacent white segments. What remains are two flat extrusions with horizontal upper borders. Extrusions from near vertical borders are reduced in a similar fashion during a vertical removal process. The limit for eliminating undesired extrusions is given by the maximum allowed run-length value in a scan line or pixel column.

While the illustration of FIG. 10a has an image with only one dot shading removal area such an image could have a plurality of areas to be processed. All shaded areas of an image are actually processed in one pass through the image. The removal process starts with the generation of the process parameter tables and ends with the execution of the process as defined in the tables. More detailed information about dot removal is included in the section DOT, SPECK AND LINE REMOVAL.

Defining a Dot-Shading Zone

A dot-shading zone is an area in which a plurality of dots have been detected in a FIND-Dot process (1630, FIG. 1h). This process FIND-Dot establishes scan line portions which appear 'dotty'. A second process 1632 assembles zones on a page which contain a plurality of such 'dotty' scan line segments. Then each of these zones undergo a process 1634 in which an effective dot size is established. The same secondary process establishes a 'work-sheet' for the actual 'de-dot' process. A final step 1636 protects long skinny information from removal. The use of multiple preprocesses reduces the time effort for applying the actual 'de-dot' process to the entire page. The FIND-Dot process (FIG. 1i) scans the image scan line by scan line for significant scan line portions 1506 which contain no white segments having run lengths over a predetermined value. Within each such line portion, black segments 1510 having run lengths over a predetermined value are sought. If long black segments are found, and are not at the ends of the line portion, the line portion is considered dotty, but considered to have no associated dot size 1530 (likely a mixture of dots and characters). If no long black segments are found 1520, the mean value of the black segment run lengths in the line portion is considered to be the dot 'size' of that line portion. The location, length and dot size (if any) of each such detected line portion is saved into a work table. Later this table is used to determine the 'effective' dot size for the entire zone.

In the FIND ZONES process, FIG. 1j, the above work table is studied to establish dotty zones. A dotty zone is an area in which dotty line portions have been detected and in which dotty line portions overlap with dotty line portions on other near by scan lines. The top and bottom dotty line segments determine the vertical delimiters of the dot shaded zone, the most left and most right ends of the dotty line segments are the horizontal delimiters of the dot shaded zone. The required closeness of the overlapping dotty line segments is a user set parameter. It is a requirement that the topmost and bottom most dotty line segment in a dotty zone have a determined dot size. If the width or height of a dotty zone is less than a predetermined value, the zone is ignored.

Figure 11:
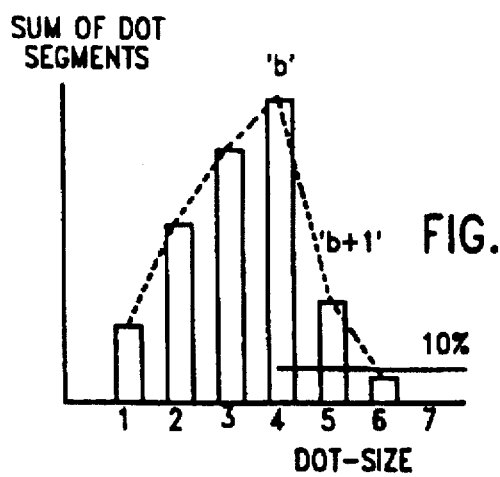
FIG. 11 is a graphic representation of the dot size table used to determine the maximum dot size for the dot removal process.

The FIND DOT SIZE process step, FIG. 1k, determines the size of the dots inside the defined zone. A dot size table is set-up with values between 0 and the maximum determined dot size. For each dotty line segment which is in the dotty zone, and which has a determined size 1644, entry in the dot size table associated with said dot size is incremented by the length of the dotty line segment 1646. Upon completion of the accumulation process the sums accumulated in the dot size table (see FIG. 11) show which dot sizes occurred most often 1648 (FIG. 1k). If the sum accumulated for dot size 'a+1' (dot size 5 in FIG. 11) is less than 10% of the sum listed for the most often occurring dot size 'a' 1652 (dot size 4 in FIG. 11) then the maximum size of a dot to be removed has a run-length of 'a' 1654. If the sum accumulated for dot size 'a+1' is at least 10% of the sum registered for dot size 'a' then the 'a+1' 1656 is the maximum run-length value for dots to be removed, the effective dot size.

While the preferred embodiment follows the above rule to determine the maximum size for dots to be removed, other algorithms may be used without departing from the spirit of this invention, adjusting process parameters to the actual work conditions by evaluating the characteristics of the image and then setting the parameters for the follow-on processes.

The de-dot zones and the determined dot size may be reported for analysis.

De-Shade Protection

Figure 12:
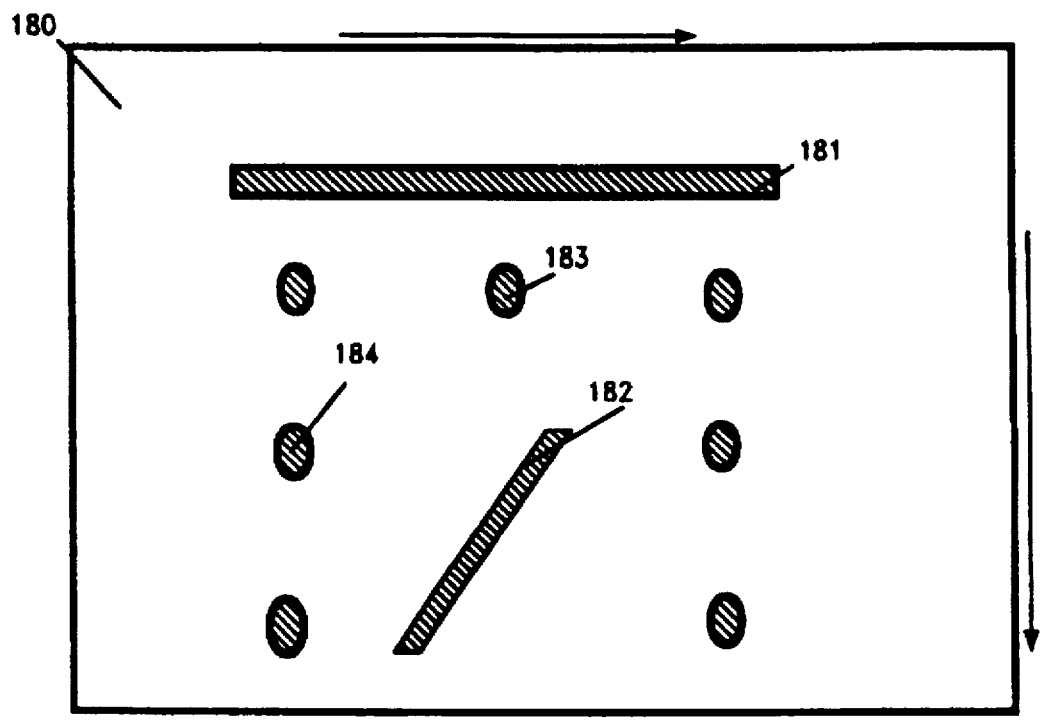
FIG. 12 is an illustration showing different types of objects which pertain to the dot shading removal process.

FIG. 12 is an illustration of an area having several dots to be eliminated and two lines, which would be damaged if not protected prior to the actual de-dot process steps, because they are thinner than the effective dot size.

Inside a dot shaded zone protective areas are set-up to prevent the elimination of matter having run-length values in one direction shorter than effective dot size value, while exhibiting significant run-length values in the other direction. Since dots tend to be roundish, the long runs often are characters and lines. To create protection for characters and lines a dot shaded zone is first scanned horizontally for finding run lengths exceeding the effective dot size by at least 100%. The segments with run-length above the defined value are registered by their addresses. A second step is applied to the dot shaded zone after the vertical run-length values have been established. This second step finds and registers addresses of vertical segments with run-lengths exceeding the effective dot size by at least 100%. The registered run-lengths are excluded from the following dot removal steps (except for their tips which are not protected until the depth of effective dot size is reached).

An established work table codifies the rectangular area where dots were detected and their dot size for the dot-removal process. The horizontal and vertical protection zones are also codified.

In the preferred embodiment the horizontal protection zones mentioned above require a vertical run-length representation of the image. This vertical representation of the image need only represent the vertical runs inside the dot shaded zone, the work area of the process. This restriction allows the creation of a faster and more memory conserving solution than the obvious one (creating a vertical run length representation of the entire image). Also, the vertical representation is not affected in this process because it is only a detection process, the vertical line detection process requires a vertical run-length representation of the image, and a sharing of such resource can happen in this step.

FIG. 12 is a simplified illustration of an area with unprotected and protected black segments. In zone 180 horizontal line 181 is recognized as protected area in the horizontal scan step, slanted line 182 is recognized as protected area in the vertical scan step. Dots 183 and 184 remain unprotected.

Figures 13B, 13C:
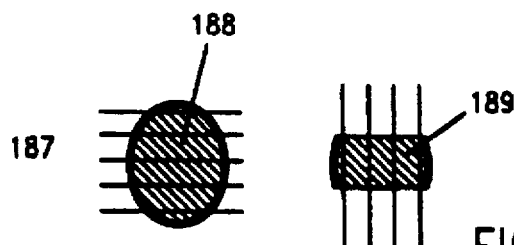
FIGS. 13a through 13c are illustrations in support of the process for dot shading removal.

Small dots with a horizontal run-length values below the effective dot size are eliminated in the first, horizontal de-dot process step. Larger dots, such as dot 188 in FIG. 13b are reduced by eliminating sections having run-length values under the dot limit on the first fourth and fifth of scan lines 187. FIG. 13c is an illustration of a dot 188 after passing the first de-dot process step. As can be seen in FIG. 13c, on the scan lines 186 the vertical run-length values of the remainder 189 of dot 188 are below the dot limit and will be eliminated in the second, vertical de-dot process step.

Figure 13A:
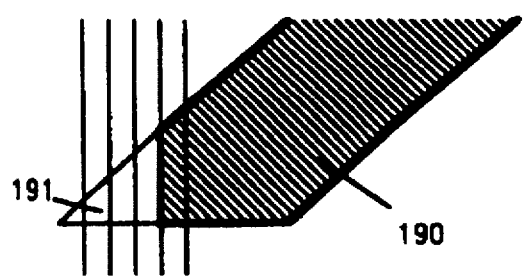

This process may change some black matter if it includes short run-length in border (or tip) areas, as indicated in FIG. 13a, in which a slanted item 190, similar to item 182 in zone 180, includes a sharp edge 191 represented by short run-length values in the area of vertical scan lines 192. Those vertical segments with run-lengths under the defined maximum value will not be protected, so the later removal process will combine these black areas with the adjacent white run-length segments, thereby cutting off the tip of slanted item 191. The tips are protected inward from the ends (the distance of effective dot size).

De-Speck

This option declares a dot zone the size of the entire image, with a user set effective dot size for the horizontal and or vertical plane. The effective dot size with this option is usually set very small, and the net effect is the removal of 'specks' (light unintentional image noise) in the image. Dot shading removal and de-specking can work together. Any detected dot shade zones as defined above in dot shading detection and removal take precedence over this declared area. DE-SPECK can work in the horizontal and vertical direction separately, and can use different height and width values for removal at the same time (user set parameters). The protected zones for characters in the dot shading removal process are also respected by the De-speck. De-speck can be used with character protection enabled.

Line Detect

Line detect is an operation in which lines are detected, even if they interfere with characters and/or are degraded. In follow-on processes, not necessarily in direct sequence, lines are detected, the detected lines are registered and removed, and the line characteristics are reported for analysis. This process is illustrated in FIGS. 1m an 1n. FIG. 1m summarizes the processes of line detection and removal. Figure in summarizes the process of establishing the envelope of a line.

Figure 1N:
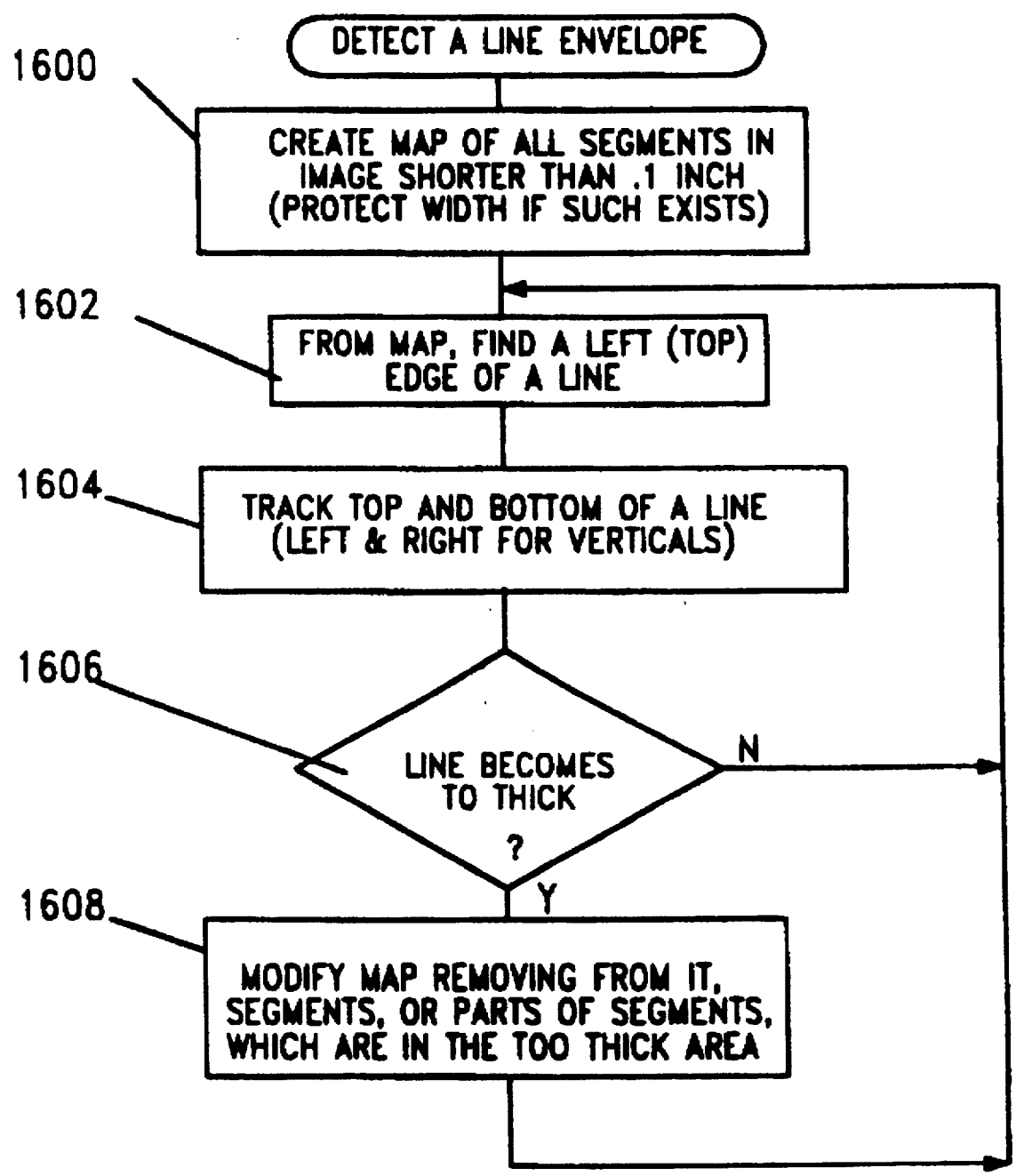
Figure 1O:
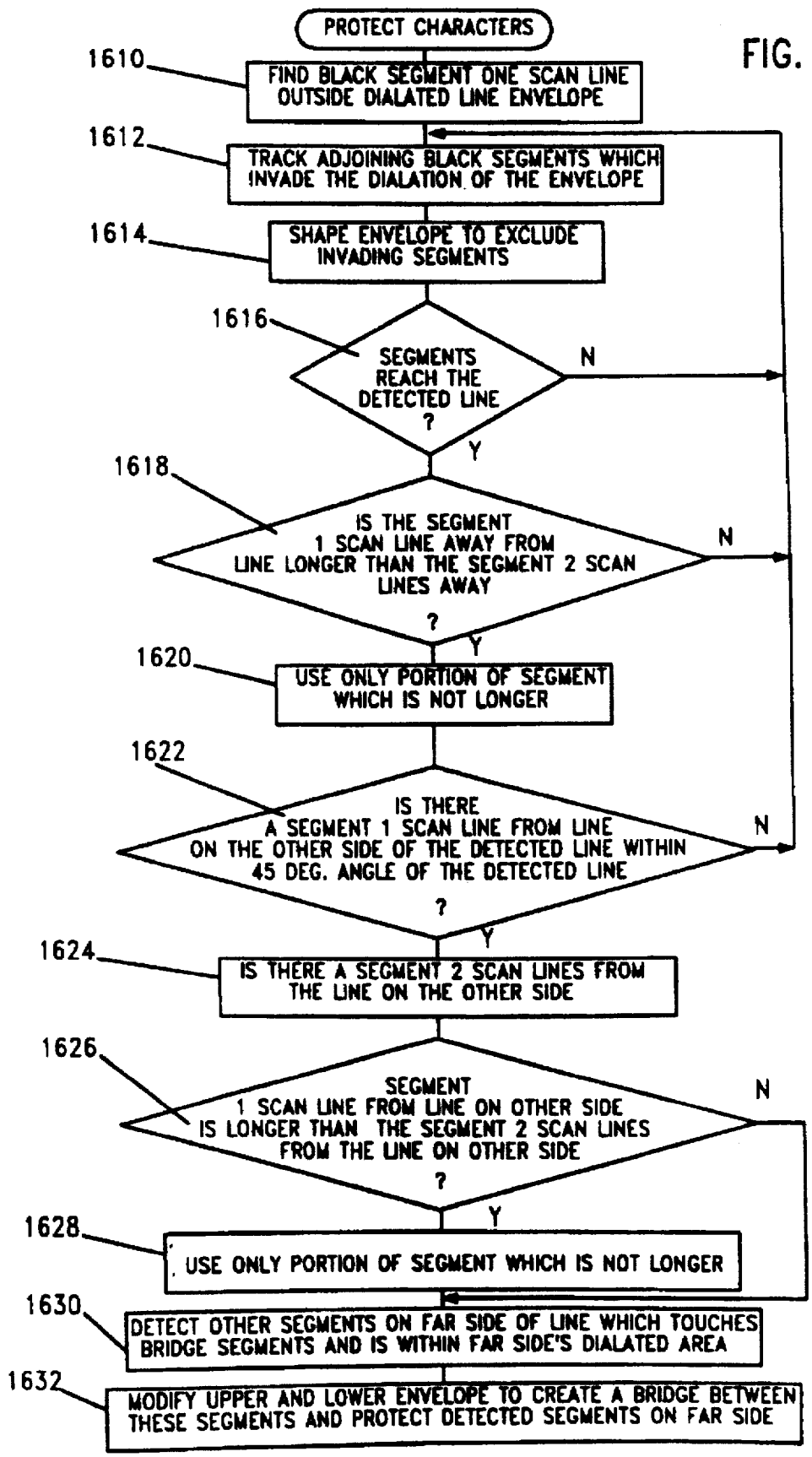

The line segment specification is tied to the resolution of the image. The process operates only on lines containing segments of a predetermined minimum length. In the first step of the process all line segments in the image which are longer than a predetermined minimum length (in pixels) are entered into a run-length worktable (the line builder worktable) with scan line address and run-length values. This predetermined length is on the order of 0.1 inch. If Character protection for line removal is active, the minimum length is the width of the maximum run to consider for reconstruction plus 1 (1600 FIG. 1n).

In the preferred embodiment, a 'line gap' option causes the above work table to treat line segments separated by very short (usually 1 or 2 pixel) white segments to be treated a single line segment. The resultant map would look identical with the line gap option as it would if the short white segments had first been removed.

The following process step (1602 & 1604) creates from the line builder work table a FROM-array map and a TO-array map. The FROM-array map and the TO-array map define top and bottom scan line addresses for each pixel column of a line to be processed. FIG. 16c is an illustration of a slightly bent line extending over a total of 8 scan lines. The dotted line 1815 and the dash/dotted line 1816 indicate the FROM and TO scan line addresses.

This step starts at a segment with a second predetermined length on the order of 0.5 inch or longer. The process tries to scan leftward for connecting segments in the first work table. This finds the left end of the line. There may or may not be connecting segments to the left.

In the follow-on step the top and bottom edges of the actual line are defined from its left end to its right end by studying the first work table. In this step segments in vertically adjacent scan lines are checked. If they have entries in the work table their scan line addresses are entered into the pixel column location of the FROM-array and the TO-array, respectively. In this process all segments in adjacent scan lines are checked for black pixels in preceding pixel columns and the scan line addresses of the connected segments are entered into the FROM-array and TO-array, respectively.

Figure 16A:
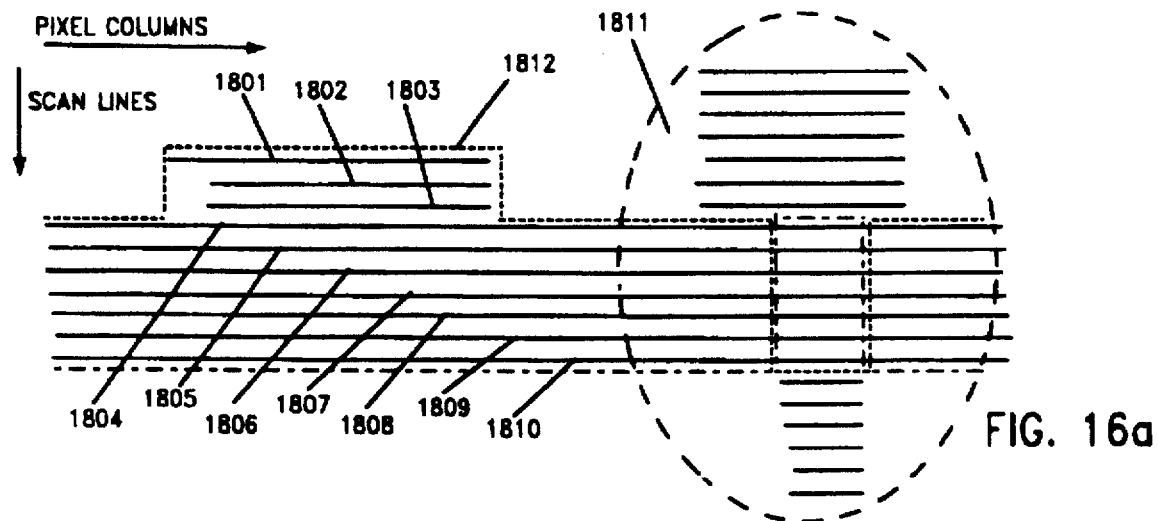
FIGS. 16a through 16c are illustrations in support of the horizontal line removal process.

FIG. 16a is an illustration of a horizontal line consisting of segments 1801 through 1810 in 10 scan lines. The three highest segments start in later pixel columns than the lower seven segments and end in earlier pixel columns than the lower seven segments. In the right half of FIG. 16a line segments 1804 through 1810 intersect with segments of a symbol 1811. The segments of the symbol 1811 will be protected as shown below. As a result of this process step the original line is represented in the FROM-array and the TO-arrays as scan line numbers for the pixel columns. The dotted line 1812 represents the FROM-array of pixel column addresses, the dash/dot line 1813 represents the TO-array of pixel column addresses. At the end of this step the FROM-array contains for each pixel column the scan line address of the highest line segment, the TO-array contains for every pixel column the address of the lowest scan line segment. Thereby an area of the line is defined in a pixel map address. To include all possible short segments close to the upper and lower edges of the line.

Figure 16B:
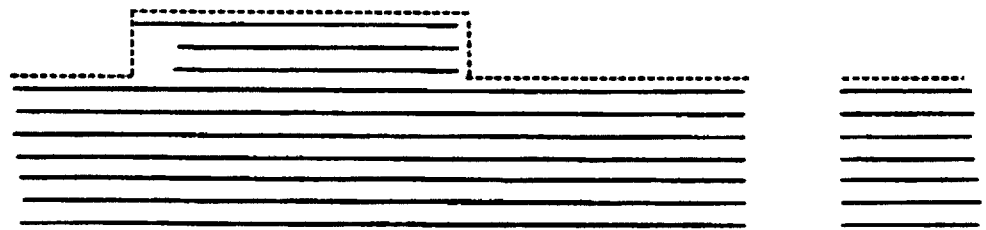
Figure 16C:
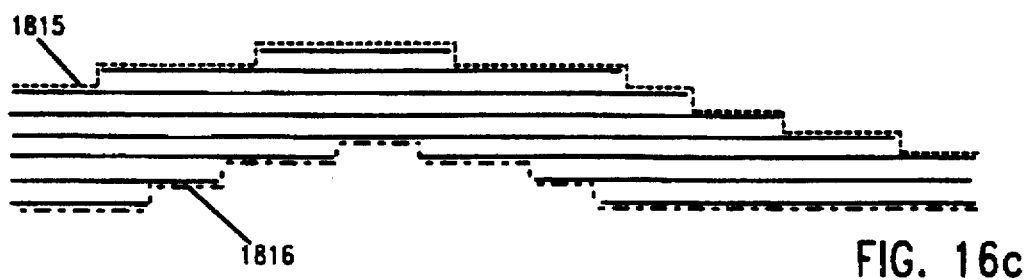

The detected line may cross some other printed matter objects, which exceed the predetermined, user defined, maximum thickness of a line to be removed 1606 (FIG. 1n); see referenced item 181 in FIG. 16a. An intermediate process step will remove such objects from the first work table, by modifying the representation of the image in the said worktable 1608, and will re-initiate the line detect process in the modified image. The intermediate correction process involves determining the location at which the line thickness exceeds the set limit and the associated run-length values in a scan line just outside the set line thickness. The sections of the segments passing through the protective areas are removed from the worktable, together with the segments outside the line to be removed in the area where the thickness of the line exceeds the set maximum value. A new FROM array and a new TO array are established in the line builder worktable. This process is repeated until the arrays contain only lines of admissible thickness, see FIG. 16b.

The so defined line 1556 (FIG. 1m) is subjected to a cleaning dilation process 1558. The cleaning dilation process uses the FROM-array and the TO-array and subtracts from the scan line addresses of the FROM-array a user defined predetermined value and adds to the scan line address of the TO-array a second user defined predetermined value. FIG. 16c shows a cleaning dilation factor of 2, on border 1825 and 1826. These predetermined values may be different or equal, as needed and depend also of the quality of the print. This dilation process enlarges the area of the detected line and includes automatically. The edge noise (common in images) found next to lines during the line removal process.

The detected lines, or at least the starting address, length and maximum thickness of the lines may be reported for analytical processing.

Character Protection For Line Removal

Character protection is a process in which a line 1000 (FIG. 17a) intersecting segments of symbols and characters 1001a, 1001b and 1001c is redefined in such a fashion as to exclude the characters and symbols intersecting it. This process is detailed in FIG. 10.

The process is executed in several steps. In a first operation the area of line 1000 is defined by an envelope including the zones 1010a and 1010b. This area is scanned for black segments which enter zones 1010a and 1010b and connect with line 1000. An extension area of the black segment entering the area of line 1000 is determined and defined as a protected area. The last step of the process deletes all black in and between zones 1010a and 1010b and outside the protected zone. This process will be described in more detail with respect to FIGS. 17a through 17e.

Figure 17B:
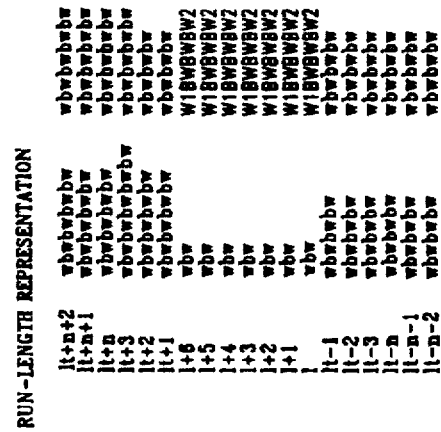
FIGS. 17a through 17e are illustrations in support of the process removing horizontal lines intersecting printed information.
Figure 17A:
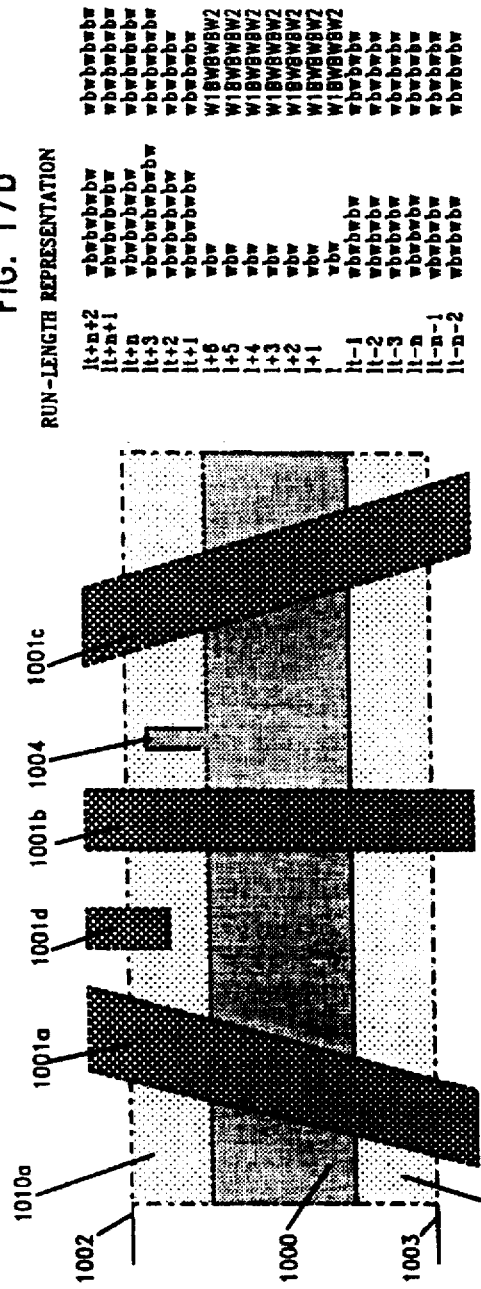
Figure 17C:
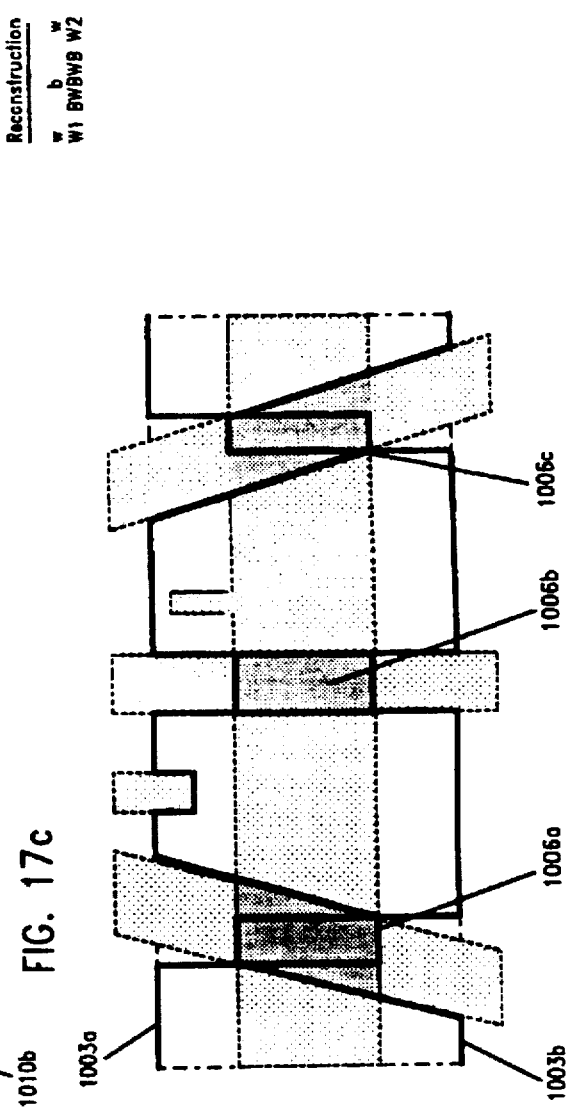
Figure 17D:
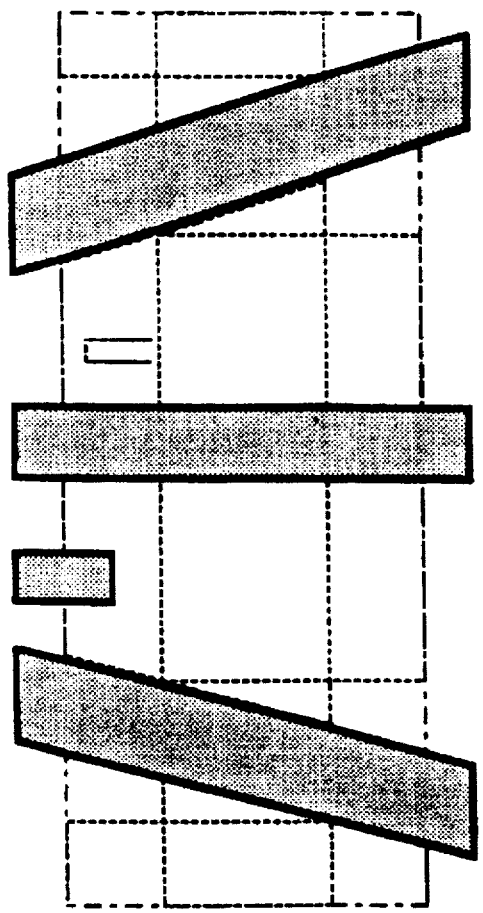

In FIG. 17a horizontal line 1000 intersects with elements 1001a, 1001b and 1001c, which may be parts of characters, symbols or other printed items. A fourth part 1001d of a printed item ends close to line 1000 but is not intersected by line 1000. Line 1000 has a small extrusion 1004. FIG. 17b is a symbolic representation of the run-length code of the section of FIG. 17a. White run-length value are represented by "w", black run-length values are represented by "b". It is assumed that the begin of each of the scan lines has a white run-length. The first' column of the run length table defines the scan line. The second column contains the symbolic run-length code. The third column contains the symbolic run-length code after eliminating the area of line 1000 and reconstruction of the printed matter segments 1001a through 1001c with the newly defined run-length values in capitalized letters. Below the table there is an example of how a black run-length value 'b', representing a scan line of the area of line 1000 is replaced by three black run-length values 'B' and two white run-length values 'W'. The white run length values 'w' left and right of line 1000 are replaced by run-length values 'W1' and 'W2", which include the black section of line 1000 at the left and the right end, which are converted from black to white.

Given a line 1000 with buffer zones 1010a, with upper border 1002, and 1010b, with lower border 1003, which are 'n' scan lines thick. ('n' is a user defined value, edge cleaning factor, representing the area where line noise is likely.) A process determines black run lengths just outside the upper and the lower borders 1002 and 1003 of buffer zones 1010a and 1010b, respectively (1610, FIG. 10). Such run lengths may relate to information intersected by line 1000. This process is applied to the upper buffer zone 1010a and to the lower buffer zone 1010b. Each and every so detected potential segment (1001a, 1001b, 1001c and 1001d) is traced by determining the vertically corresponding run length in the next scan lines in buffer zones 1010a and 1010b towards line 1000 (1612, FIG. 10). If no corresponding run length is found, as in the case of segment 1001d, which terminates inside buffer zone 1010a, the process of protection at that particular location is terminated (1614 and 1616, FIG. 10). For segments reaching the area of line 1000 a search is made to determine whether there is a segment protruding from the opposite side of line 1000 into the opposite buffer zone (1622"1632, FIG. 10). Such a 'bridge' is protected from the line removal processing. The result of this operation are two border lines 1003a and 1003b, which have overlapping areas 1006a, 1006b and 1006c, where bridges have been detected. The area below upper border line 1003a AND above border line 1003b is codified into a work table for a later step in which all black items in this defined area will be converted to white.

Figure 17E:
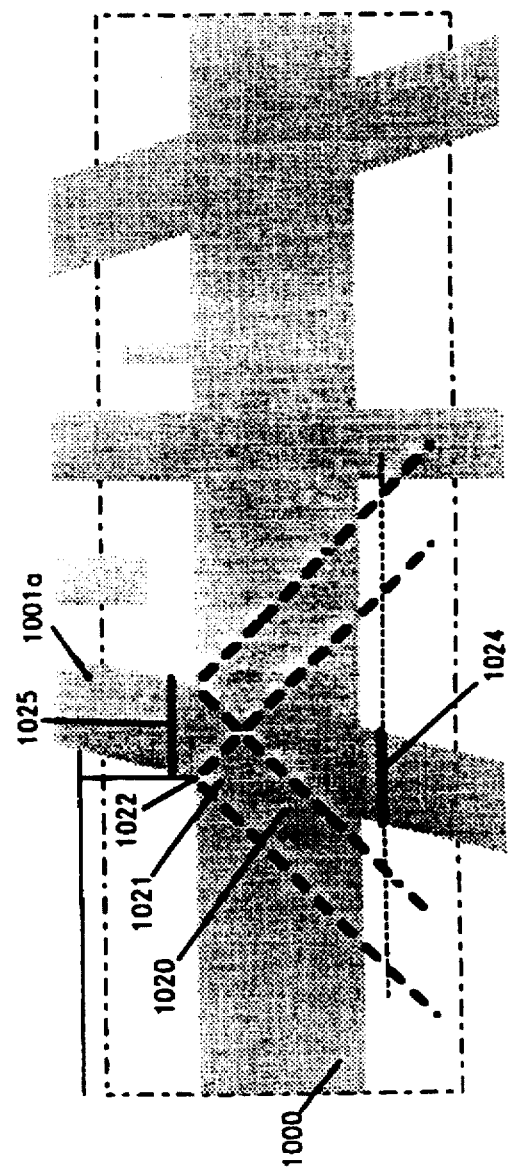

FIG. 17e is an illustration of the process for establishing a potential bridge from a black line 1001a above horizontal line 1000 to a black line 1001a below line 1000. When recognizing a intersection 1022 of the leading edge of line 1001a with the top edge of line 1000 a search is started whether there are black run-length segments below line 1000 and within an area 1020 defined by an angle 1021 of 45° The same search is started from intersection 1023 of the trailing edge of line 1001a with the top edge of line 1000.

If two or more run lengths are found in the above search, if one is straight across, it only is bridged to, if one is found to the left and another to the right, both are bridged to.

Edge Noise Interference Management

The run length of the black segment one scan line above 1022 (FIG. 17e) is trimmed to a maximum length of the black run length of 1025 two scan lines above line 1000. The run length of black segment below 1024 is trimmed to a maximum of the black run-length value of line two scan lines below line 1000. This eliminates any inaccuracies introduces in the area of intersection points 1022 and 1023 are excluded from evaluation and will be incorporated in the adjacent white run-length value. This is illustrated in FIG. 1o, 1618, 1620, 1626 & 1628.

When detecting vertical lines, a vertical run-length representation of the image is used. In the preferred embodiment, the original horizontal run-length representation is maintained however, because the actual line removal process happens later, and the vertical representation is abandoned at that time, rather than being maintained through the removal process.

Dot, Speck and Line Removal

In the preferred embodiment the removal of dots, specks, and lines is combined into one step for improved performance. The SHADE, SPECK AND LINE REMOVAL process is presented with the following information by previous processes: INVERT TEXT presents zones surrounding inverted areas. DE-SHADE presents zones with an effective dot size, and any table of character protection areas (both horizontal and vertical). DE-SPECK presents an effective speck size and a table of character protection zones both horizontal and vertical. LINE REMOVAL presents line shape maps which may have been modified to protect characters during the removal process.

Figure 1P:
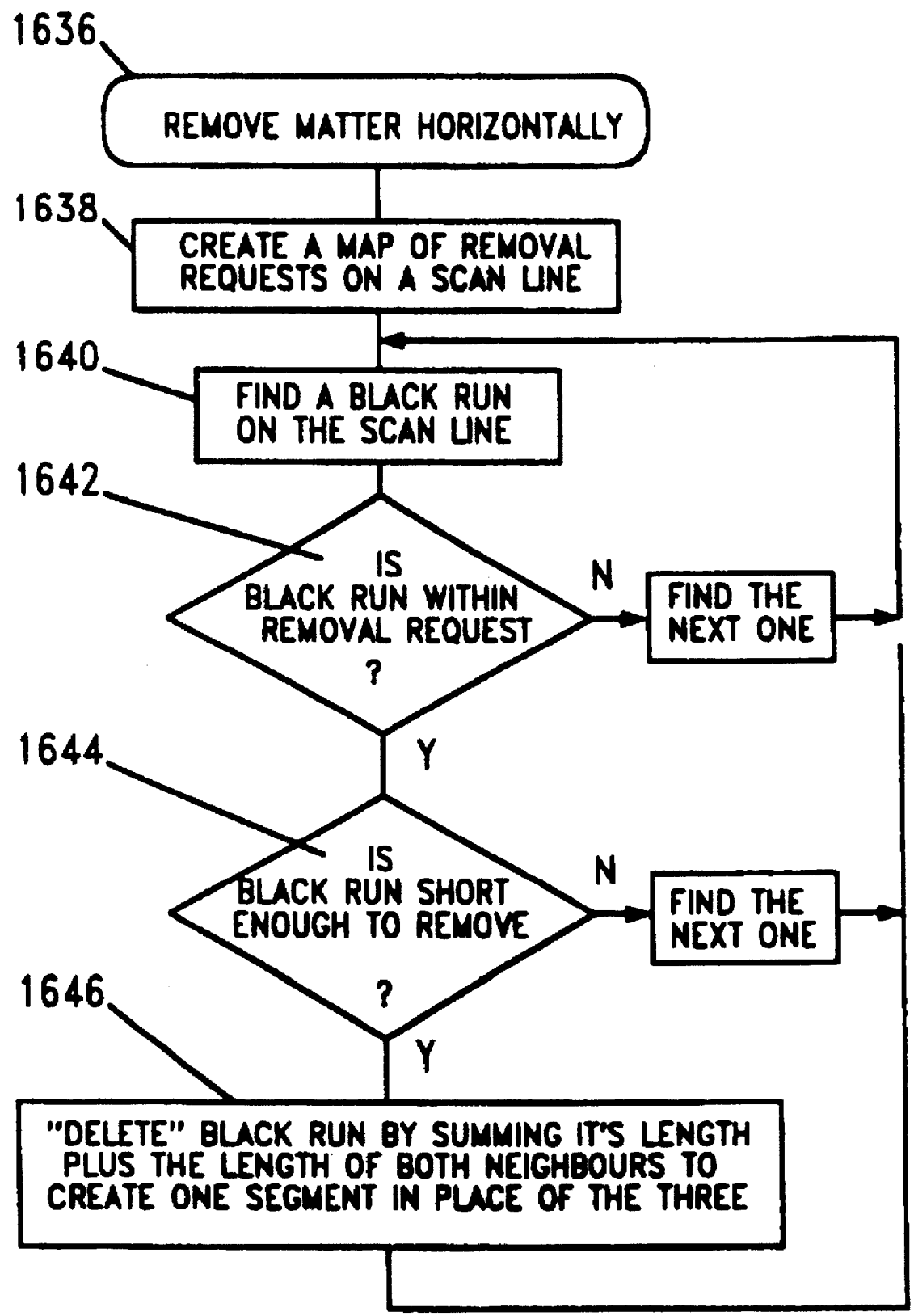
Figure 1R:
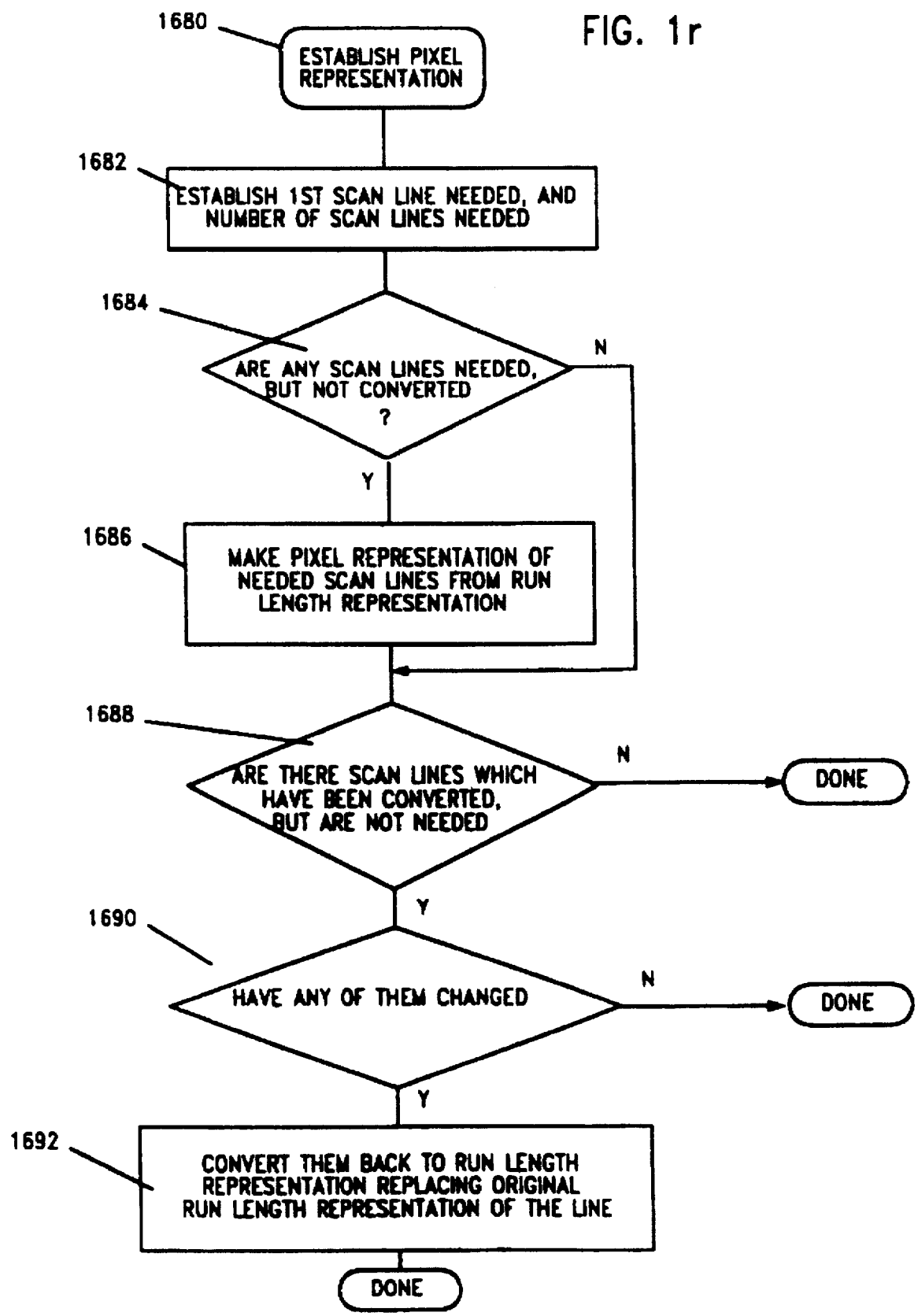
Figure 1Q:
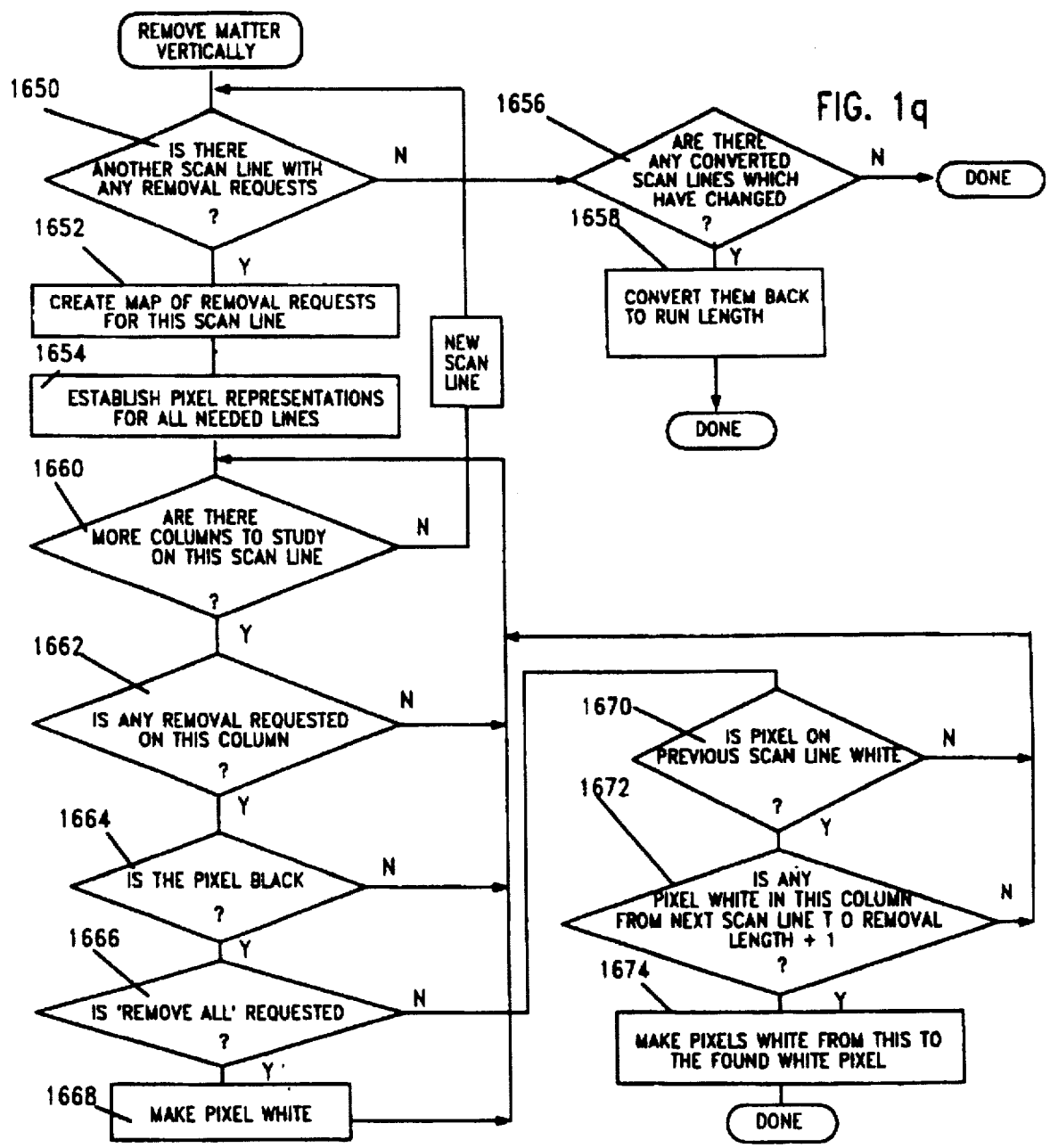

FIG. 14 illustrates the process of creating horizontal and vertical information removal maps. The image 400 contains a shaded zone 402 with an effective dot size of 6. It has a horizontal protect area 404, and a vertical protect area 406. Since protected areas 404 and 406 are greater than the effective dot size of 6, they will not be removed in the removal processes. FIG. 14 also has an inverted matter area 405 with a clean request border 410 (The clean request is for a 2 pixel cleaning, as it is in the preferred embodiment). FIG. 14 also has a vertical line 412. The horizontal removal map 420, and the vertical removal map 422 represent the removal requests for the indicated horizontal scan line 414. FIGS. 1p, 1q and 1r are flow charts which illustrate portions of this process. FIG. 1p is a summary of horizontal matter removal. FIG. 1q is a summary of vertical matter removal. FIG. 1r is a summary of the process of establishing necessary pixel representations of scan lines.

The first process in shade, speck and line removal is the removal of horizontal component information (FIG. 1p). (In the preferred embodiment, line removal is always treated as vertical component information whether it is horizontal or vertical.) Per scan line, a map is created of the information to be removed 1638. The map portrays the size of any requests for horizontal removal where those requests are on the scan line of interest. The map also portrays horizontally protected areas as 'no-remove' areas. The scan line of the image is then scanned for black run-lengths 1640 which are shorter than the largest effective object size (1642 to 1644) at that horizontal offset, matching run lengths are deleted 1646.

The second process of shade, speck and line removal is the removal of vertical component information, FIG. 1q. This is done in a pixel map representation of the image. As with the horizontal component, a map is created 1652 per horizontal scan line portraying the largest effective object size to remove in each column. It portrays a no-remove segment where vertical protect is active, and portrays a remove-all segment for any object marked for deletion by line removal detect. (Such objects represent the line with character protection already established, and include both horizontal and vertical lines.) The scan line of the pixel map representation of the image is scanned to do any necessary deletions. For each pixel on the scan line, the length of any requested deletion is observed 1662. If the pixel is marked 'remove-all' 1666, then any black pixel is made white 1668. If there is a deletion request of size 'N', AND if the current pixel is black 1664, AND if the pixel in the same column in the previous scan line is white 1668, then if there are any white pixels in the same column on the next N+1 scan lines 1672, then all pixels on that column between the working scan line and the scan line with the white set pixel are made white 1674.

Because the maintenance of a pixel map representation of an entire image can require prohibitive amounts of memory, and because in real images there are frequently large areas of image with no need of de-shade, de-speck or line removal, it has proven unnecessary to convert the entire image from a horizontal run-length representation to a pixel map representation for the above process. Rather, when the removal map is made, the largest effective object size is noted. The process of selection for line conversion is presented in FIG. 1p. Only the scan lines from (working line −1) to (working line + largest object size +1) need be converted to a pixel representation for the above process to work correctly. If a scan line only contains remove-all requests, only 1 scan line need be converted. Scan lines whose pixels never prove to change in this process need never be converted back to a run-length representation. This cycle of SHADE, SPECK and LINE removal may be run after all detection is complete, or may be run after any group of detection processes is complete.

Thus, all items to be removed from the image are collected in a listing representing the map shown in FIG. 14. The actual deletion of the items ro be deleted can be performed at a later time in the process.

What is claimed is:

1. A process for enhancing an image of a scanned document, said image including a plurality of lines of textual matter, said plurality of lines potentially being skewed relative to boundaries of said image, requiring registration, containing inverted text matter and undesired dots, vertical and horizontal lines, said process comprising a step for providing a primary scan line run-length coded image of said document;
   a sub-step for determining and reducing a skew,
   a sub-step for determining said registration
   a sub-step for detecting said inverted text matter and reversing said inverted text matter,
   a sub-step for detecting said undesired dots and listing said undesired dots as items to be deleted in a map,
   a sub-step for detecting said vertical lines and listing said detected vertical lines as items to be deleted in said map,
   a sub-step for detecting and listing said detected horizontal lines as items to be deleted in said map;
a step for deleting said a step for selectively activating one or more of the last three substeps; and items to be deleted listed in said map.

2. A process for enhancing an image of a scanned document as claimed in claim 1, wherein said process step for deleting said items to be deleted eliminates run-length coded segments by adding the segment length of the segment to be deleted to the sum of the length of the adjacent run-length segments.

3. A process for enhancing an image of a scanned document as claimed in claim 1, wherein said process steps for detecting and reversing said inverted text matter reverse said inverted text matter by adding adjacent segment lengths at the border of said inverted text matter.

4. A process for enhancing an image of a scanned document as claimed in claim 1, wherein said process includes a step for converting said primary scan line run-length coded image into a secondary scan line run-length coded image having run-length segments normal to the run-length segments of said primary run-length coded image.

5. A process for enhancing an image of a scanned document as claimed in claim 1, wherein said image is run-length coded for horizontal scan lines, said process further includes a step for converting said image to a run-length coded image with vertical scan lines.

6. A process for enhancing an image of a scanned document as claimed in claim 1, wherein said image is run-length coded for horizontal scan lines, said process further includes a step for converting selected sections of said image to a pixel mapped image prior to applying said step for deleting said items to be deleted, wherein said detected vertical lines are listed in said map as said items to be deleted.

7. A process for enhancing an image of a scanned document as claimed in claim 1, wherein said process includes a step for selectively converting a section of said primary scan line run-length coded image into a pixel map, applying said step for deleting said items to be deleted to said selected section, wherein said detected vertical lines are listed in said map as said items to be deleted, and a step for reconverting said so processed pixel map into a new primary scan line run-length coded image.

8. A process for enhancing an image of a scanned document as claimed in claim 1, wherein said image is run-length coded for horizontal scan lines, said process further includes a step for converting selected sections of said image to a pixel mapped representation prior to applying said step for deleting said items to be deleted, wherein said detected vertical lines are listed in said map as said items to be deleted.

9. A process for enhancing an image of a scanned document as claimed in claim 1, wherein said image is run-length coded for horizontal scan lines, said process further includes a step for converting selected sections of said image to a pixel mapped representation, steps for processing said selected sections of said image, and a step for converting and integrating said so processed pixel mapped sections into said primary scan line run-length coded image.

* * * * *